(12) United States Patent
Zhang

(10) Patent No.: US 11,363,236 B1
(45) Date of Patent: Jun. 14, 2022

(54) PROJECTION-TYPE VIDEO CONFERENCE SYSTEM

(71) Applicant: AMPULA INC., Bellevue, WA (US)

(72) Inventor: Yajun Zhang, San Jose, CA (US)

(73) Assignee: AMPULA INC., Bellevue, WA (US)

( * ) Notice: Subject to any disclaimer, the term of this patent is extended or adjusted under 35 U.S.C. 154(b) by 0 days.

(21) Appl. No.: 17/203,780

(22) Filed: Mar. 17, 2021

(51) Int. Cl.
*H04N 7/15* (2006.01)
*G10L 15/22* (2006.01)
*H04N 5/63* (2006.01)
*H04N 9/31* (2006.01)

(52) U.S. Cl.
CPC ............. *H04N 7/15* (2013.01); *G10L 15/22* (2013.01); *H04N 5/63* (2013.01); *H04N 9/3141* (2013.01); *G10L 2015/223* (2013.01)

(58) Field of Classification Search
CPC ............ H04N 7/15; H04N 7/147; H04N 9/31; H04N 5/63; G10L 15/22; H04L 65/403
USPC .......................................... 348/14.01–14.08
See application file for complete search history.

(56) References Cited

U.S. PATENT DOCUMENTS

| | | | | |
|---|---|---|---|---|
| 2012/0056971 | A1* | 3/2012 | Kumar | H04L 65/403 348/14.02 |
| 2014/0176664 | A1* | 6/2014 | Wu | H04N 7/15 348/14.07 |
| 2016/0181805 | A1* | 6/2016 | Lin | H04W 4/80 700/297 |
| 2020/0007820 | A1* | 1/2020 | Dunn | G06F 3/0486 |
| 2020/0259350 | A1* | 8/2020 | Colavito | H02J 7/0047 |
| 2020/0310514 | A1* | 10/2020 | Nicholson | G06F 16/22 |
| 2021/0203881 | A1* | 7/2021 | Zhou | H04N 9/31 |
| 2021/0250562 | A1* | 8/2021 | Moon | F21V 9/08 |

* cited by examiner

*Primary Examiner* — Melur Ramakrishnaiah

(57) ABSTRACT

The embodiments of the disclosure provide a projection-type video conference system, which includes a video conference device and a cloud service system. The cloud service system is configured to provide services to the video conference device. The video conference device includes: a camera assembly configured to acquire image information of a conference scene and generate a conference video; an audio input assembly configured to collect voice signals of the conference scene, the voice signals including a recognizable voice instruction; a projection assembly configured to display the conference video. The video conference device can recognize the voice instruction, and perform, according to the voice instruction, an operation corresponding thereto. The video conference device may be controlled through voice, and it has high integration and is convenient to carry.

13 Claims, 10 Drawing Sheets

PROJECTION-TYPE VIDEO CONFERENCE SYSTEM

TECHNICAL FIELD

The present disclosure relates to the technical field of video conference, and particularly to a projection-type video conference system, a video conference device and a method for performing a video conference by the video conference device.

BACKGROUND

In recent years, with the rapid development of video conferencing technologies, remote working, distant education and remote collaboration have become prevailed, and are becoming increasingly accepted by people. There are mainly two kinds of video conference systems. One kind is a cloud-based video conference system depending on software applications. Such a conference system mainly relies on software applications that are provided by terminals equipped with a display screen, such as computers or mobile phones, and enables video conferences to be implemented under organization and coordination of a cloud software service system. It is suitable for multiple individuals to participate in a group meeting, but is relatively dependent on network performance. In addition, for this kind of conference system, it is usually necessary to organize a conference in advance and issue an invitation. The other kind is a hardware-based video conference system. It enables an instant video conference to be established with another video conference system by combining cameras, TV screens, speakers, microphones and a conference controlling device (such as a computer). However, for this kind of conference system, it is expensive in terms of the various devices, and has poor flexibility in installation and usage, as well as large volume, which is not convenient to carry.

SUMMARY

According to an embodiment, a projection-type video conference system may include a video conference device and a cloud service system, the cloud service system may be configured to provide services to the video conference device, and the video conference device may include an electric management assembly configuring to supply power to the video conference device, detect a power supply status of the video conference device and upload the power supply status to the cloud service system in real-time; a projection assembly may be configured to display the power supply status sent from the electric management assembly; an audio input assembly may be configured to collect voice signals of a conference scene and an audio output assembly configured to broadcast the power supply status sent from the electric management assembly, and the voice signals include a recognizable voice instruction.

In an embodiment, the cloud service system may be configured to provide a power supply status storage service for the electric management assembly.

In an embodiment, the electric management assembly comprises at least one rechargeable battery which may be configured for powering the video conference device, and wherein the rechargeable battery may be removable.

In an embodiment, the electric management assembly may be configured to detect and record a battery status of the rechargeable battery in real-time, and the electric management assembly may be further configured to upload the battery status to the cloud service system.

In an embodiment, the electric management assembly may further comprises at least one direct power supply connector configuring for directly powering the video conference device In an embodiment, the electric management assembly may be configured to detect a connecting status of the direct power supply connector of the video conference device and upload the connecting status of the direct power supply connector to the cloud service system in real-time.

In an embodiment, the electric management assembly may be configured to: in a case where it is detected that a battery level of the rechargeable battery is lower than a preset percentage, control to display a current battery level and a cruising duration of battery on a screen of the projection assembly.

In an embodiment, the electric management assembly may be configured to: in a case where it is detected that a battery level of the rechargeable battery is equal to or lower than a preset percentage, send a warning for reminding of that the projection assembly is about to be turned off, which is broadcasted via a voice message by the audio output assembly, and turn off the projection assembly in a preset time. In an embodiment, the electric management assembly may be configured to: in a case where it is detected that the direct power supply connector of the video conference device connects or disconnects to an external power supply, control to display the corresponding connecting status on the screen of the projection assembly.

In an embodiment, the electric management assembly may be configured to: in a case where the direct power supply connector of the video conference device disconnects to an external power supply while a battery level of a rechargeable battery of the video conference device is lower than a preset percentage, control to display the corresponding connecting status on the screen of the projection assembly, and control the audio output assembly to broadcast a power-off warning via a voice message at the same time.

In an embodiment, the projection assembly may further comprise a projection processor which is configured to recognize a voice instruction from the collected voice signals of the conference scene, in a case that the voice instruction is about the power supply status of the video conference device, the electric management assembly control the audio output assembly to broadcast the corresponding power supply status.

In an embodiment, the cloud service system may comprise a management and authentication service module for providing registration and login services to an electronic device, the cloud service system may be configured to provide the power supply status of the video conference device to an electronic device linked to the cloud service system after the electronic device successfully registers and logs in an account.

In an embodiment, a light source of the projection assembly may be at least one of a semi-conductor light source and a florescent light source.

BRIEF DESCRIPTION OF THE DRAWINGS

In order to more clearly explain the technical solutions in the embodiments of the present disclosure, drawings needed for the description of the embodiments will be simply introduced below. Obviously, the drawings mentioned hereafter just illustrate some embodiments of the present disclosure. For those of ordinary skill in the art, other drawings may also be obtained from these drawings without any creative work. In the drawings.

DETAILED DESCRIPTION OF PREFERRED EMBODIMENTS

Figure 1:
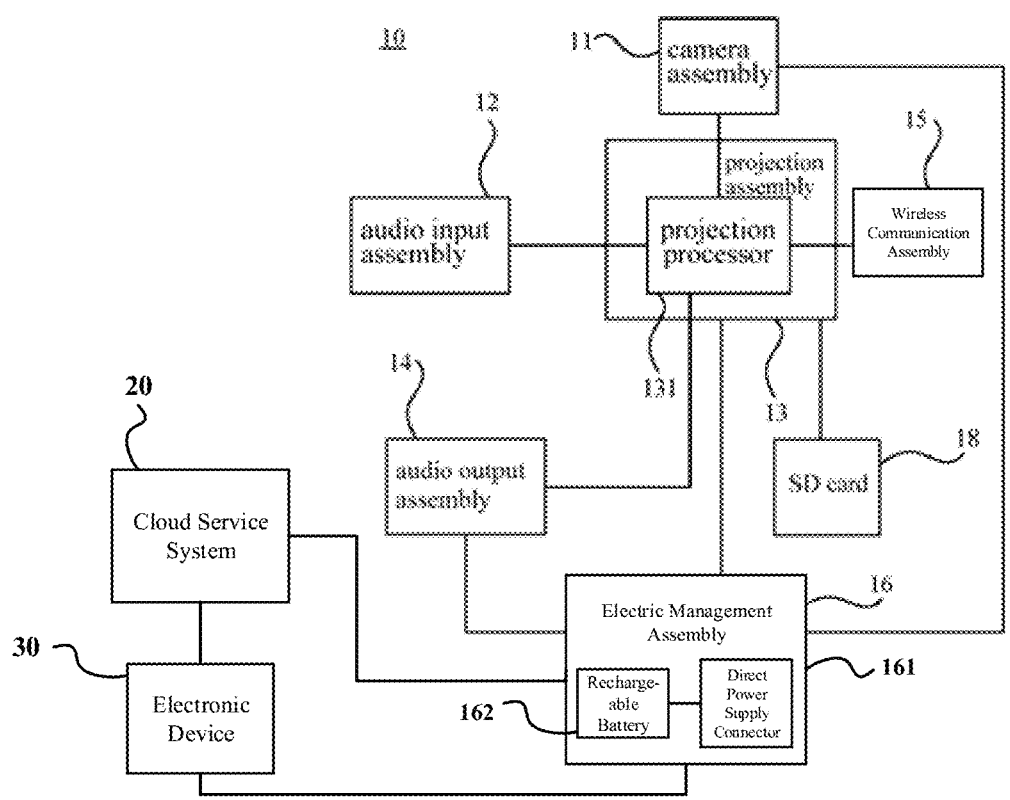
FIG. 1 is a schematic structural diagram illustrating a video conference device according to an embodiment of the present disclosure.

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments thereof. Based on the embodiments in this disclosure, all other embodiments, obtained by those skilled in the art without any creative work, shall fall within the protection scope of this disclosure.

At present, there are usually two kinds of video conference systems. One kind is a large screen conference system, which is composed of a TV screen, a camera, a microphone, a speaker, a remote control and a computer. The camera is usually installed on the top of the TV screen so as to maximize the capture of the conference scene. However, for this kind of conference system, an overlap phenomenon occurs in case of too many people. In an implementation, after the captured video is transmitted to a remote end, some people can be displayed clearly, but those people located a bit further back are either overlapped with or blocked by others, or cannot be clearly displayed for being too far away from the camera. The microphone and speaker are usually far away from the TV screen, and arranged on a conference table to facilitate the collection of voice information from conference participants and the broadcasting of the voice information sent from another party joining the conference. Since the audio and video devices are independent of each other, synchronization distortion happens in case of poor network performance, which degrades the quality of the conference. The computer may be configured to start and manage video conferences, share screens, or the like. This kind of video conference system needs to be installed in advance, and the conference room therefor is relatively fixed; in this case, various wires, such as TV power cord, camera power cord, High-Definition Multimedia Interface (HDMI) data cable, microphone cables or Universal Serial Bus (USB), need to be connected to the table through the floor, which is neither beautiful nor convenient to use for the collaboration work with multiple devices. The other kind is a small screen conference system, aiming at video conferences between individuals. On the basis of digital telephone devices for which a display screen and a camera are built in, the video can be displayed to each other after the call may be connected, but it is not suitable for a conference scene requiring for screen sharing due to the limited size of the screen and the limited viewing angle of the camera, and is not suitable for conferences among groups. In addition, such video conference system requires the support from an Ethernet interface and a digital telephone gateway which locations are relatively fixed, and thus it is not suitable for business travel and family use.

The present disclosure aims to solve the problems in the existing video conference systems, and provide a new video conference experience to the users. A video conference device is provided by embodiments of the present disclosure, which is portable, does not need to be wired, and can be used at any time as required. It integrates high-definition panoramic audio and video, replaces the traditional TV screen or monitor with high-definition and high-brightness projection assembly, and makes the projection size adjusted according to the projection distance. It is suitable for group meetings as well as family and personal use, and has a low cost. Furthermore, it can be configured and managed through a mobile phone or a computer. With the assistance of various functional modules of the cloud service system, an optimal point-to-point video connection with another conference device can be established, to provide an optimal video conference effect.

Embodiments of the present disclosure provide a projection-type video conference system, by which a video conference device included therein can be controlled through voice, and instant video conferences can be established. In addition, such a projection-type video conference system has high integration and is convenient to carry.

Referring to FIG. 1 which is a schematic structural diagram illustrating a video conference device according to an embodiment of the present disclosure, the video conference device 10 may include a camera assembly 11, an audio input assembly 12, a projection assembly 13 and an audio output assembly 14.

The camera assembly 11 may be configured to acquire panoramic video of a conference scene. The camera assembly 11 may include a camera. The camera may include a wide-angle lens, and it may be a 360-degree panoramic camera or a camera covering a part of the scene. Two or three wide-angle lenses may be adopted. Each wide-angle lens may support a resolution of 1080P or 4K or more. The videos captured by all the wide-angle lens may be spliced together by means of software to generate high-definition videos of the 360-degree scene, with such generated high-definition panoramic video remained at the resolution of 1080P. During the conference, all participants in the conference may be tracked in real time and the speakers may be located and identified, by performing artificial intelligence (AI) image analysis on the panoramic video. The camera assembly 11 may transmit the captured image information to the projection assembly 13.

In addition, the camera assembly 11 may further include a housing, a motor and a lifting platform (which are not shown). The motor and the lifting platform may be arranged within the housing, and the lifting platform may be arranged above the motor for carrying the camera. The camera may be arranged on the lifting platform. The motor may be configured to drive, upon receiving a signal instruction, the lifting platform to move up and down and thus bring the camera to move up and down, so as to make the camera protrude out of or hide inside the housing.

The audio input assembly 12 may be configured to collect voice signals. The audio input assembly 12 may be a microphone, or may adopt an array of microphones supporting 360-degree surround in the horizontal direction. For example, it can adopt an array of 6 digital Micro Electro Mechanical System (MEMS) microphones, which are evenly and circumferentially distributed in the horizontal plane and each have a function of Pulse Density Modulation (PDM), for interaction with near and far fields; alternatively, it may adopt an array of 6+1 microphones, with one microphone located in the center to capture far-field audio. In an implementation, the array of digital microphones may suppress sound pickup in non-target directions by means of beamforming technology, thus suppressing noise, and it may also enhance the human voice within the angle of the voice source, and transmit the processed voice signal to a digital signal processing module 1311 of the projection assembly, as show in FIG. 2.

Figure 2:
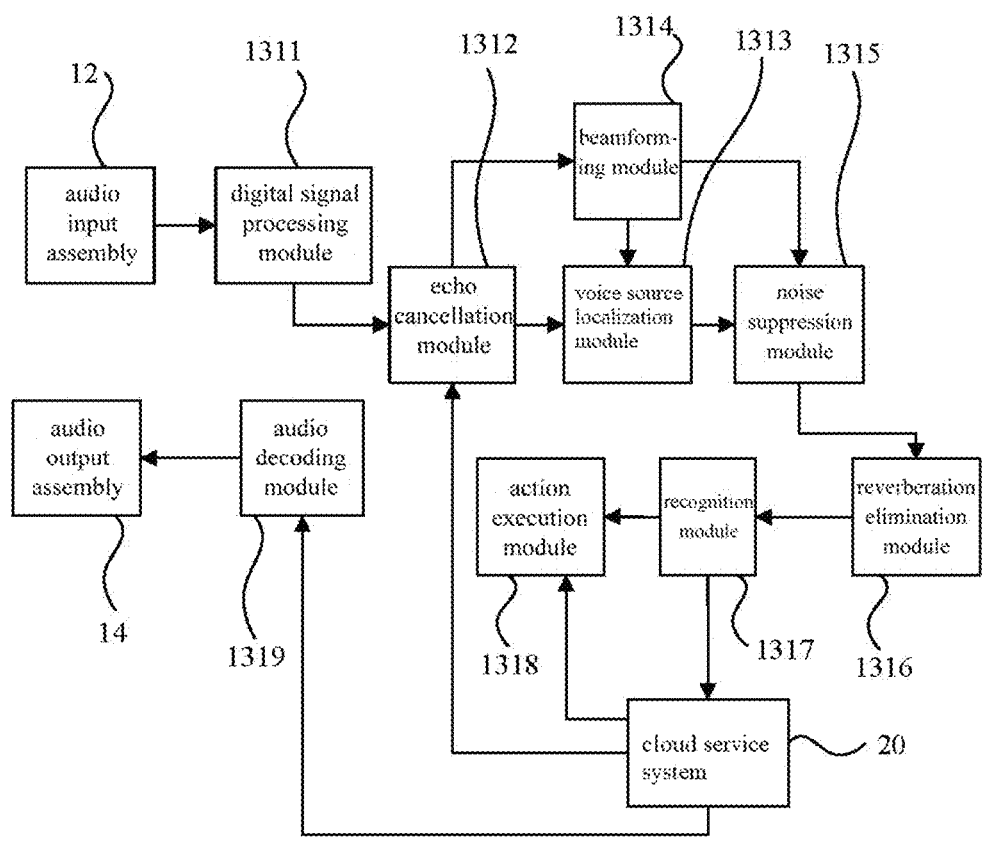
FIG. 2 is a schematic diagram illustrating connections with an audio input assembly, an audio output assembly and a cloud service system according to an embodiment of the present disclosure.

Turn to FIG. 2, the digital signal processing module 1311 may be configured to digitally filter, extract and adjust the PDM digital signal output by the array of digital microphones, to convert a 1-bit PDM high-frequency digital signal into a 16-bit Pulse Code Modulated (PCM) data stream of a suitable audio frequency. An echo cancellation module 1312 may be connected with the digital signal processing module 1311 to perform echo cancellation processing on the PCM data stream, to generate a first signal. A beamforming module 1314 may be connected with the echo cancellation module 1312 to filter the first signal output by the echo cancellation module 1312, to generate a first filtered signal. A voice source localization module 1313 may be connected with the echo cancellation module 1312 and the beamforming module 1314, and may be configured to detect, based on the first signal output by the echo cancellation module 1312 and the first filtered signal output by the beamforming module 1314, a direction of the voice source and form a pickup beam area. In an implementation, the voice source localization module may be configured to calculate a position target of the voice source and detect the direction of the voice source by calculating, with a method based on Time Difference Of Arrival (TDOA), a difference between the times at which the signal arrives at the individual microphones, and to form the pickup beam area. A noise suppression module 1315 may be connected with the voice source localization module 1313 to perform noise suppression processing on the signal output by the voice source localization module 1313, to generate a second signal. A reverberation elimination module 1316 may be connected with the noise suppression module 1315 to perform reverberation elimination processing on the second signal output by the noise suppression module 1315, to generate a third signal. A recognition module 1317 may be connected with the reverberation elimination module 1316, and may be configured to recognize keywords/phrases from the voice signal after the front-end processing, and send the recognition result to the action execution module 1318 so that the action execution module 1318 may perform an action corresponding to the recognition result, or send the recognition result to a cloud service system 20 for further recognition. It should be noted that the process of how the recognition module 1317 recognizes the signal output by the reverberation elimination module 1316 and the process of how the cloud service system performs further recognition on the recognition result will be illustrated below.

It should be noted that, the digital signal processing module 1311, the echo cancellation module 1312, the voice source localization module 1313, the beamforming module 1314, the noise suppression module 1315, the reverberation elimination module 1316, the recognition module 1317, the action execution module 1318 and an audio decoding module 1319 may be included in a projection processor 131 of the projection assembly 13 (see FIG. 1), that is, the projection processor 131 of the projection assembly 13 may be configured to perform the subsequent processing operations on the voice signals output by the audio input assembly 12. Alternatively, the video conference device 10 may include a main processor (not shown), with the main processor including the digital signal processing module 1311, the echo cancellation module 1312, the voice source localization module 1313, the beamforming module 1314, the noise suppression module 1315, the reverberation elimination module 1316, the recognition module 1317, the action execution module 1318 and the audio decoding module 1319, that is, the main processor may be configured to perform the subsequent processing operations on the voice signals output by the audio input assembly 12. It should be noted that, the above-mentioned modules 1311 to 1319 may be implemented in the projection processor 131 or the main processor by means of software, as well as possible associated hardware and/or firmware.

The projection assembly 13 may be configured to display video information of the conference. For example, the projection assembly may display video of an input signal from a computer or an external electronic device, or may also display the panoramic video captured by the camera assembly or another conference scene video sent from the another conference device. The conference's screen information to be displayed may be selected on a conference system application installed on the computer and the external electronic terminal. In an implementation, the projection assembly 13 may include the projection processor 131, and the projection processor 131 may be configured to perform the subsequent processing on the voice signals output by the audio input assembly 12, receive videos sent from other devices, and perform projection display. The projection processor 131 may also configured to perform partial identification and delineation on the images of the participants in the conference by means of image analysis and processing algorithms, and then project the images after being subject to partial identification and delineation, in horizontal or vertical presentation, onto an upper side, lower side, left side or right side of the projection area. The projection processor may also be configured to assist the array of microphones in positioning, focusing or magnifying the sound of the speaker in the video conference, by means of the image analysis and processing algorithms.

Preferably, since a semi-conductor light source, such as a laser has advantages of for example high brightness, wide color gamut, true color, obvious orientation and long service life, the projection assembly 13 may adopt a projection technology based on a laser light source, and the output brightness may be 500 lumens or more. As such, the video conference device 10 may output videos having a resolution of 1080P or more, and may be used to project the video coming from the another party joining the conference or realize screen sharing of the electronic terminal devices such as computers or mobile phones. It can be understood that the projection assembly 13 is not limited to adopting the projection technology based on a laser light source, and may also adopt a projection technology based on an LED light source. In an embodiment, the projection assembly 13 may adopt a florescent light source or laser light combined with florescent light.

The audio output assembly 14 may be configured to play the audio signal sent from the projection processor 131 or the main processor. It may be a speaker or a voice box, and may be for example a 360-degree surround speaker or a locally-orientated speaker.

Figure 3:
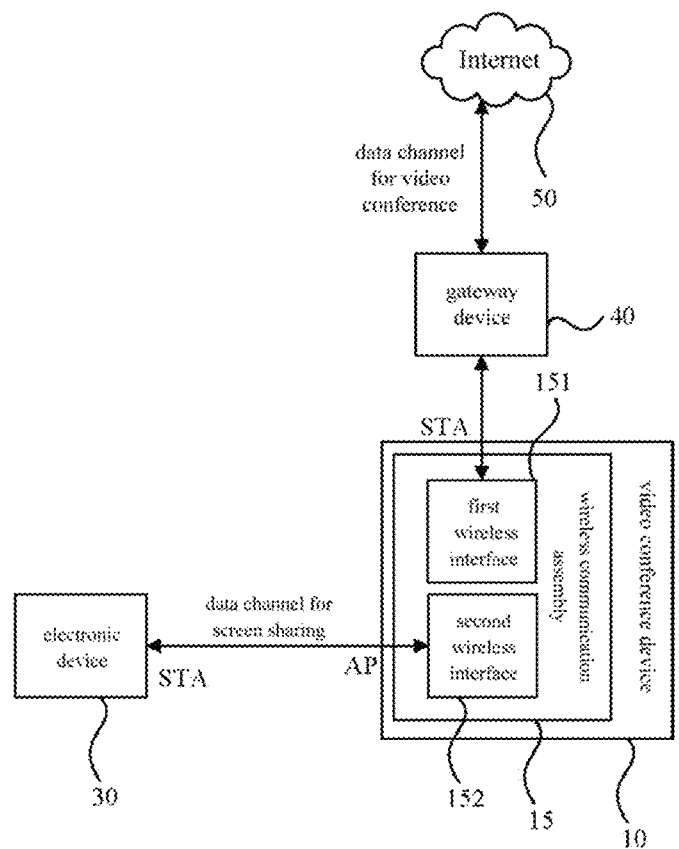
FIG. 3 is a schematic diagram illustrating connection between an electronic device and the video conference device illustrated in the embodiment of FIG. 1.

Continuing to refer to FIG. 1, the video conference device 10 may further include a wireless communication assembly 15, which may access Internet 50 through WIFI and may access the video conference with the assistance of the cloud service system 20, where the cloud service system 20 may also accesses the Internet. In an implementation, the wireless communication assembly 15 may be a WIFI wireless communication assembly. As shown in FIG. 3, the wireless communication assembly 15 may be connected to the projection processor 131, and the wireless communication assembly 15 may include a first wireless interface 151 and a second wireless interface 152. The video conference device 10 may be connected to and communicate with the Internet 50 through the first wireless interface 151, and the video conference device 10 may communicate with the electronic device 30 through the second wireless interface 152 for connection and interaction with the electronic device 30.

Further, the wireless communication assembly 15 in the video conference device 10 may work in a dual-frequency mixed mode. The first wireless interface 151 may be a 2.4 GHz wireless interface, and the second wireless interface 152 may be a 5 GHz wireless interface. The electronic device 30 may be a mobile phone or a computer on which a software application runs, and the user may interact with the video conference device 10 by operating the software application. In this dual-frequency mixed mode, the video conference device 10 may access the wireless network through the 2.4 GHz communication protocol and work at a Station (STA) mode, connect and communicate with the Internet 50 via the gateway device 40. In another aspect, the 5 GHz wireless interface may work in the Access Point (AP) mode or wireless routing mode, by which the electronic device 30 may access the AP network or wireless routing network, and may then communicate directly with the video conference device 10, which enables the screen information of the electronic device 30 to be displayed by projection. In this way, a data channel for screen sharing may be established between the electronic device 30 and the video conference device 10, and a data channel for video conference may be established between the video conference device 10 and the Internet 50. It can be understood that, the 5 GHz wireless interface may also be configured to work in the STA mode, and the 2.4 GHz wireless interface may be configured to work in the AP mode. The screen sharing projection and the video conference may be carried out at the same time, and they may keep their respective data rates maximized, since they work at different frequency bands which do interfere with each other. Furthermore, since the screen sharing of the electronic device 30 bypasses the gateway device 40, and the electronic device 30 is very close to the video conference device 10 at the time of screen sharing, it is particularly advantageous in terms of projection delay and communication rate.

Figure 4:
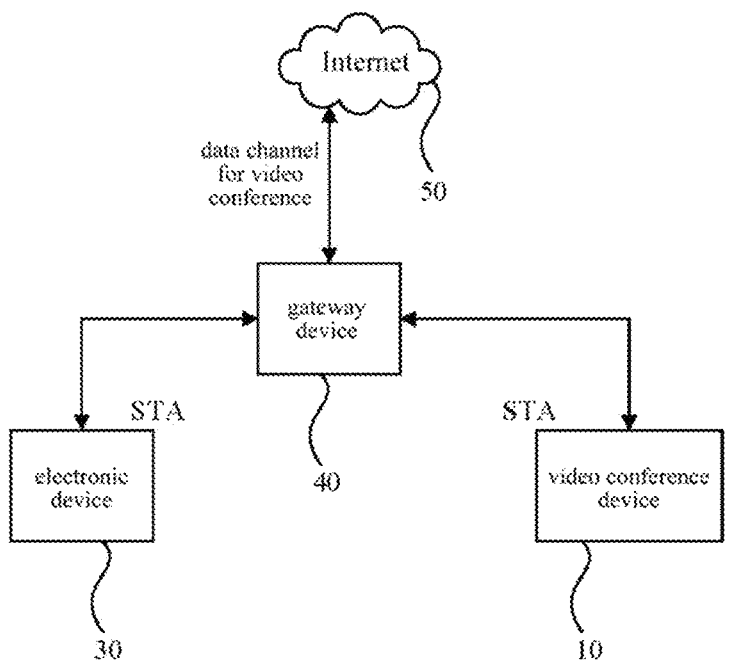
FIG. 4 is a schematic diagram illustrating connection between an electronic device and the video conference device illustrated in the embodiment of FIG. 1.

In another particular embodiment, as shown in FIG. 4, the electronic device 30 may communicate with the video conference device 10 via network. In an implementation, the electronic device 30 and the video conference device 10 may access a same WIFI network, and communicate with each other via the gateway device 40. In this case, the video conference device 10 and the electronic device 30 are both configured in the STA mode when they work, and access the WIFI wireless network via the gateway device 40. The electronic device 30 may find, manage and communicate with the video conference device 10 by means of the gateway device 40. Both the data acquisition from the cloud or the execution of video sharing by the video conference device 10 need to pass through the gateway device 40, occupying a same frequency band and interface resource.

Figure 5:
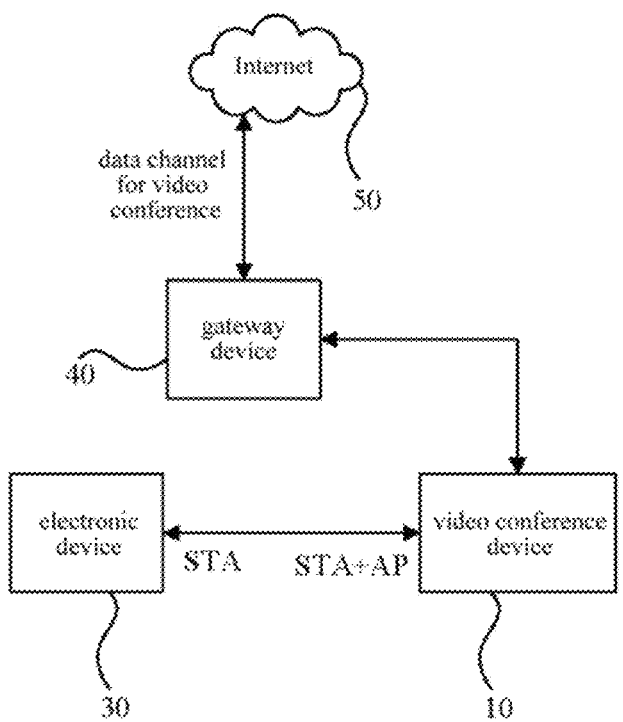
FIG. 5 is a schematic diagram illustrating connection between an electronic device and the video conference device illustrated in the embodiment of FIG. 1.

In another particular embodiment, as shown in FIG. 5, the electronic device 30 may directly access the wireless network of the video conference device 10 to communicate therewith, and the wireless communication assembly 15 in the video conference device 10 may work in both the STA mode and AP mode, which belongs to single frequency time division communication. Compared with the dual frequency mixed mode, the data rate will be halved.

Figure 6:
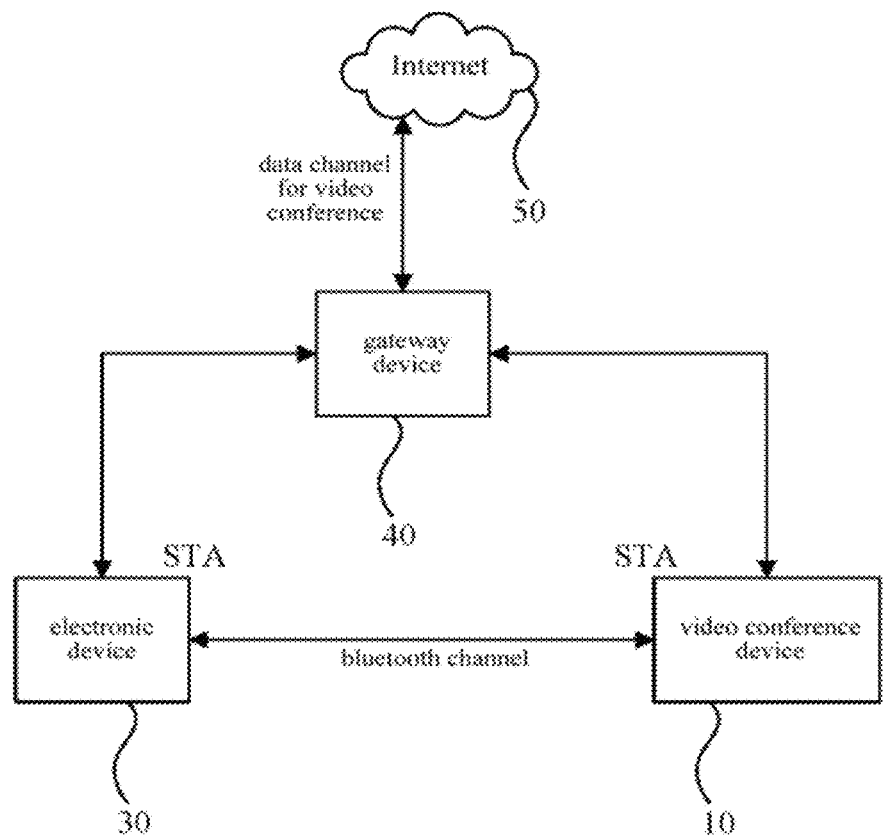
FIG. 6 is a schematic diagram illustrating connection between an electronic device and the video conference device illustrated in the embodiment of FIG. 1.

In another particular embodiment, as shown in FIG. 6, the electronic device 30 may also communicate with the video conference device 10 through wireless Bluetooth, that is, a Bluetooth channel may be established between the electronic device 30 and the video conference device 10. In this case, the electronic device 30 and the wireless communication assembly 15 in the video conference device 10 all work in the STA mode, and high-speed data may be processed through WIFI, for example, the video stream may be played.

Figure 7:
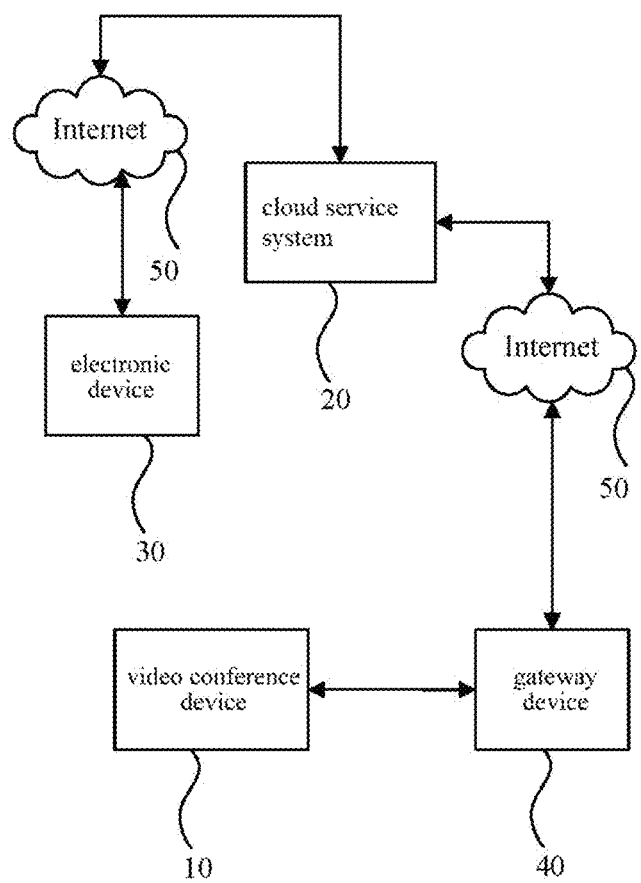
FIG. 7 is a schematic diagram illustrating connection between an electronic device and the video conference device illustrated in the embodiment of FIG. 1.

In other particular embodiments, as shown in FIG. 7, the electronic device 30 may communicate with the video conference device 10 remotely via the cloud service system 20. In remote communication, the electronic device 30 and the video conference device 10 do not need to be on a same network. The electronic device 30 may send a control command to an access management service module of the cloud service system 20, and the command may be transmitted to the video conference device 10 through a secure signaling channel established between the video conference device 10 and the cloud service system 20, thereby enabling communication with the video conference device 10. It should be noted that this mode may also enable communication interactions between different video conference devices.

Continuing to refer to FIG. 1, the video conference device 10 may have an electric management assembly 16 configured to supply power to the video conference device 10, detect a power supply status of the video conference device 10 and upload the power supply status to the cloud service system 20 in real-time. Further, the projection assembly 13 may be configured to display the power supply status sent from the electric management assembly 16, the audio input assembly 12 may be configured to collect voice signals of a conference scene and an audio output assembly 14 may be configured to broadcast the power supply status sent from the electric management assembly 16. The electric management assembly 16 may be connected to and power the camera assembly 11, the projection assembly 13, the audio input assembly 12 and the audio output assembly 14. The electric management assembly 16 may include at least one of a rechargeable battery 162 and a direct power supply connector 161 which may be configured for directly powering the video conference device 20 through an external power supply. The power supply status includes a battery status of the rechargeable assembly 162 and a connecting status of the direct power supply assembly 161. The rechargeable battery 162 and the direct power supply connector 161 can supply power for the video conference device 20 independently or together. In an implementation, the direct power supply connector 161 can be connected to the rechargeable battery 162, for charging it.

Since the rechargeable battery 162 is adopted to supply power, the video conference device may be convenient to carry and use at any time as required. In an implementation, each charge may support a video conference for a period, for example four hours, or support an audio conference for a longer time. If the battery level is low, the battery may be charged through a USB port or the direct power supply connector 161, such as a DC adapter interface.

In an implementation, the rechargeable battery 162 may be embodied as a removable 3.7V lithium-ion battery, which may be charged by a direct current of 15V/3 A. As described above and in the drawings, the cloud service system 20 may be configured to provide services to the video conference device 10. More specifically, the cloud service system 20 is configured to provide a power supply status storage service for the electric management assembly 16. A battery status of the rechargeable battery 162 may be detected and recorded by the electric management assembly 16 in real time during use, the electric management assembly 16 may be further configured to upload the battery status to the cloud service system 20 and the user may configure one or more alerting patterns for a low battery level by means of the software application. In an implementation, in a case where it is detected that the battery level of the rechargeable battery 162 is lower than a preset percentage, the electric management assembly 16 is configured to control the projection assembly 13 to display a current battery level and a cruising duration of battery on a screen. For example, a small window may be opened for alerting, during the projection process; to be specific, information on the battery level may be displayed onto the video screen if the battery level is below a preset percentage (such as 30%), and the display of the information on the battery level may be maintained on the video screen until one person participating in the conference clicks "OK" by using a remote control or the terminal device; even after the person participating in the conference clicks "OK", the alerting message may be displayed again if a preset period of time elapses or the battery level is lower than a lower percentage (such as 20%), which similarly requires one person participating in the conference to click "OK", and the projection assembly 13 may reduce the brightness of projection so as to alter the user. In an implementation, in a case where it is detected that a battery level of the rechargeable battery 162 is equal to or lower than a preset percentage, the electric management assembly 16 may be configured to send a warning for reminding of that the projection assembly 13 is about to be turned off, and the warning is broadcasted in a voice message by the audio output assembly 14 at the same time, and the electric management assembly 16 may turn off the projection assembly 13 in a preset time. For example, a waring statement "The remaining battery level of the system can hold on for only a few minutes, and the system will be closed automatically if not being charged" may be displayed on the video screen if it is detected that the battery level is equal to or lower than a preset percentage (such as 10%). In an alternative implementation, an alert may be presented by means of the state of an LED, or a SMS alert may be sent by means of the software application, which means that the electric management assembly 16 of the video conference device 10 may push a notification message to a software application on a mobile phone or computer by means of an event pushing service module 28 of the cloud service system 20 if the battery level is lower than a certain threshold, with the notification message including the current battery level. In addition, during the projection and video conference, the remaining available period of time, during which the projection or the conference can be continued, may be estimated based on the current battery level and power consumption, and it may be displayed at an appropriate position on the projection screen or on the wall. Similarly, the electric management assembly 16 may be configured to detect a connecting status of the direct power supply connector 161 of the video conference device 10 and upload the connecting status of the direct power supply connector 161 to the cloud service system 20 in real-time. In an implementation, in a case where it is detected that the direct power supply connector 161 of the video conference device 10 connects or disconnects to an external power supply, the electric management assembly 16 controls to display a corresponding connecting status so as to remind the user. For example, when detecting that the direct power supply connector 161 disconnects to the external power supply, the electric management assembly 16 controls to display an alerting signal, such as, "the direct power supply connector is disconnecting", on the screen, or the audio output assembly may be configured to broadcast this altering signal in a voice message. For another example, a small electric plug symbol for reminding that the direct power supply connector 161 is connected to the external power supply may be displayed on the projection screen. In an embodiment, where the direct power supply connector 161 disconnects to the external power supply while the battery level of the rechargeable battery 162 of the video conference device 10 is lower than a preset percentage (for example 5%), the electric management assembly 16 is further configured to control the projection assembly 13 to display a disconnection warning on the screen, and controls the audio output assembly 14 to broadcast a power-off warning, such as "the battery is temporarily unavailable, please not to cut off the direct power supply connector" at the same time. In an embodiment, the projection processor 131 of the projection assembly 13 may be configured to recognize the voice instruction from the collected voice signals of the conference scene, in a case that the voice instruction about the power supply status of the video conference device 10, the electric management assembly 16 controls the audio output assembly 14 to broadcast the corresponding power supply status. For example, if someone asks "how much the battery power is left" in the conference scene, the audio input assembly 12 collects the voice signal and sends to the projection processor 131 for analyzing and generating instructions, and the electric management assembly 16 is configured to control the audio output assembly 14 to broadcast, according to the instructions, the battery level.

The video conference device 10 may further include a multi-function LED and a light guide. The multi-function LED may be configured to characterize the current volume, the current wireless connection status, the current cloud service association status, the current battery level, the current conference connection status, the current mute or video off status, or the like. The light guide may be configured to assist the LED such that the display of the LED is centralized in terms of position, bringing a better user experience. For example, slow flashing of the green LED indicates that it is in the wireless connection, and continuous illumination of the green LED indicates that the wireless connection is successful and the Internet Protocol (IP) address is successfully obtained.

The video conference device 10 may also be provided with multiple physical buttons, including but not limited to buttons that support volume control, privacy protection, system startup or wake-up, factory configuration restoration, video conference access permission or hang up, and the like.

The video conference device 10 may also include a Secure Digital Memory Card (SD card) 18. As for the projection assembly 13, it may download videos and store them in the SD card 18 so that such videos can be played in an offline case such as a gathering or an entertainment activity. In addition, the conference video may also be stored in the SD card 18 for projection and replay at any time.

Based on the various components in the video conference device 10 described above, the working principle of the video conference device 10 will be described below.

First, the user may input a voice signal through the array of digital microphones. The array of digital microphones may collect voice information input by the user, modulate it into a PDM-encoded digital signal and output it. Then, the digital signal may be input to the audio input interface of the projection processor 131 or to the main processor.

The projection processor 131 or the main processor may recognize the voice signals output by the audio input assembly 12 to obtain keyword information, and perform an operation corresponding to the keyword information, or send the keyword information to the camera assembly 11 so that the camera assembly 11 may perform the operation corresponding to the keyword information. The keyword information may include command keywords/phrases, confirm keywords/phrases, or wake-up keywords/phrases, in which the confirm keywords/phrases may include "yes" or "no".

In a particular embodiment, voice control may be performed based on a local built-in thesaurus. That is, some command keywords/phrases may be stored locally in advance to form a thesaurus, with such command keywords/ phrases including for example "open the projection assembly", "turn off the projection assembly", "turn on/off the camera assembly", "please shut down", "turn up the volume" and "turn down the volume". In actual use, it may be detected whether the keyword information recognized from the voice signal input by the user is included in the thesaurus, and if it is, a corresponding operation may be performed. For example, if the main processor recognizes that the voice command issued by the user is "open the projection assembly", it may control the projection assembly 13 to open.

Further, a speech recognition model adopted by the projection processor 131 or the main processor may effectively recognize these keywords/phrases, after being subject to template training and parameter tuning. If the command keywords/phrases are recognized, the corresponding actions may be directly executed. For example, once "please shut down" is recognized, the projection processor 131 or the main processor may control the shutdown action to be executed. For some important actions, the user may be asked to confirm whether such actions will be performed or not before the execution thereof, and if no confirmation keyword/phrase is recognized within a specified period of time, the corresponding commands will be cancelled by default.

In another particular embodiment, the voice control function may be woken up before the execution of voice control. That is, wake-up keywords/phrases may be set, which are configured to make the video conference device 10 enter the working state. The wake-up keywords/phrases may be customized keywords/phases, such as "Alexa", "Hey Google" or "classmate AI". The voice control may be performed after the woken up of the voice control function. In this case, after recognizing the wake-up keywords/phrases, the projection processor 131 or the main processing may intercept a subsequent voice signal output by the audio input assembly 12 until no valid voice signal is detected in the direction of the voice source of the wake-up word(s) for a preset period of time (such as three seconds), generate a voice signal to be analyzed based on the intercepted voice signal, and input the same to the cloud service system 20, by this time a cloud semantic analysis stage is entered. The cloud service system 20 may perform semantic analysis on the voice signal to be analyzed to generate an analysis result, convert the analysis result and feedback the converted result to the video conference device 10.

It should be noted that, in a case where the voice control function is woken up by person A, the video conference device 10 of the present disclosure may be directed to pick up the sound of person A due to a voice source location function of the video conference device 10; in this case, the video conference device 10 may intercept the voice signal of person A after the woken up of the voice control function, generate a signal to be analyzed and input the same to the cloud service system 20, so as to realize the normal voice control. However, in practice, a situation where person B issues a control signal, such as "turn on the camera", after person A wakes up the voice control function would happen. In this situation, the video conference device 10 may also intercept the control signal, generate a signal to be analyzed and input the same to the cloud service system 20; After analysis, the service system 20 may find that the initiator B of the control signal is not the same person as person A who waken up the voice control function, and may feedback this situation to the video conference device 10 and request confirmation about whether to continue to perform the control command issued by person B being different from person A who waken up the voice control function; and if it is confirmed to continue to perform the control command, processing will be performed similarly to those of the above-mentioned normal situation, otherwise, the current voice control command will be cleared, and the process restarts.

Of course, it can be understood that, if the voice control signal interpreted after the woken up of the voice function includes multiple commands, the priority of these commands may be set. For example, a command related to the projection assembly may be processed first, a command related to the camera assembly may be processed secondly, and a command related to voice output may be processed at last.

By means of predefined semantic rules, the cloud service system 20 may return actions that can be understood by the video conference device 10, or return a segment of voice to the speaker for playback. For example, as for an audio input "ABC, please join Zoom meeting 225533, and the password is 1234", "ABC, please join the Zoom meeting. The password is 1234 and the meeting number is 225533" or other phrases with similar meaning, such phrases may be difficult for the video conference device 10 to recognize. In contrast, the cloud has powerful computing capabilities and strong scalability, and has Automatic Speech Recognition (ASR) models, Natural Language Processing (NLP) models and semantic analysis models; in addition, it can update and optimize various parameters in real time, process the voice analysis and response in real time, and convert the results into executable commands and returned the same to the video conference device 10. For example, the information returned to the video conference device 10 after the cloud analysis on the above-mentioned voice may be that: the conference type is "Zoom", the conference number is "225533", and the conference password is "1234", and the video conference device 10 may then execute the corresponding action according to these parameters. The cloud may also synthesize a voice signal and send it to the video conference device 10, so as to for example notify that the user's requirement represented by the voice signal cannot be understood, or make voice responses to some requirements represented by the voice signal. These may be decoded by the audio decoding module 1319 and then sent to the speaker, and meanwhile, the output audio may be subject to echo cancellation processing.

Further, the cloud service system 20 may convert the analysis result into an executable command and feedback it to the projection processor 131, so that the projection processor 131 may perform an action matching the executable command; or the cloud service system 20 may convert the analysis result into a voice signal and send it to the speaker for playback.

According to the embodiments mentioned above, a portable battery-powered video conference device, that is based on a high-definition projection assembly and a high-definition 360-degree panoramic camera assembly, is provided, in which voice-controlled human-computer interaction is introduced into such video conference device. The video conference device may include a high-definition 360-degree panoramic camera assembly, a high-definition projection assembly, a 360-degree audio input assembly, a 360-degree audio output assembly, a rechargeable battery, a WIFI wireless communication assembly, a multi-function LED, a light guide, a SD card and physical buttons for different purposes. Two or three wide-angle lenses may be adopted to capture the conference scene, and the images may be spliced together by means of software, to provide a high-definition panoramic effect in which the resolution is more than 1080P. The projection assembly may adopt high-definition and high-brightness laser projection technology, with the brightness being one to five times that of the current conference projection products. In addition, the projection size may be automatically adjusted according to the distance, which is sufficient to support medium-sized conferences or can be used as a multimedia screenless TV for family use. The replacement of traditional TV screens with the laser projection assembly greatly improves the cost performance and user experience. It is suitable for business scenarios as well as family and personal use. In a case where no video is needed, the camera assembly may be controlled to descend to hide inside the housing or automatically close the lens cover to protect privacy of the user. The audio output assembly may adopt a design presenting a 360-degree horizontal surround sound effect, which greatly improves the conference effect. The audio input assembly may adopt an array of microphones that are evenly and circumferentially distributed in the horizontal direction, and adopt audio algorithms to support 360-degree reception of remote voices and short-range voices. And on this basis, voice recognition and voice control functions are provided, by which the video conference device can be controlled. The voice can be used to control the connection of the conference, the adjustment of the volume, and turning on/off of the camera assembly or projection assembly. In addition, it may support power supply by a rechargeable battery, and thus is easy to carry; moreover, it may support a multi-function LED that may be programmed to achieve indications of different status.

Figure 8:
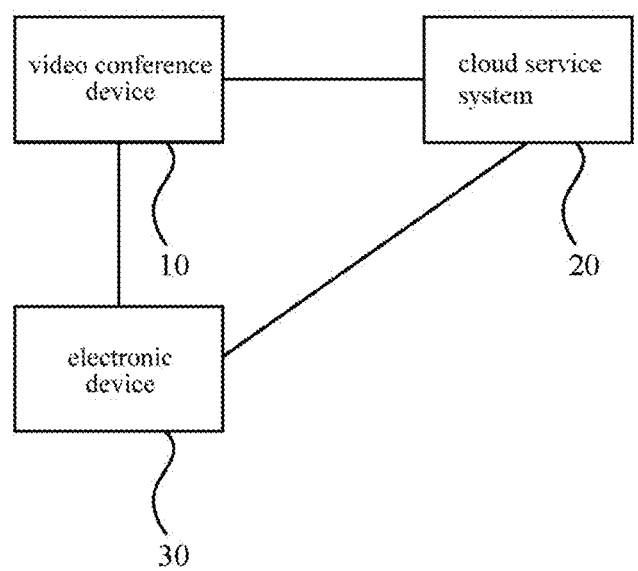
FIG. 8 is a schematic structural diagram illustrating a projection-type video conference system according to an embodiment of the present disclosure.

Referring to FIG. 8 which is a schematic structural diagram illustrating a projection-type video conference system according to an embodiment of the present disclosure, the projection-type video conference system may include a video conference device 10, a cloud service system 20 and an electronic device 30 that are connected to each other. The video conference device 10 is a video conference device described in the embodiments mentioned above.

Figure 9:
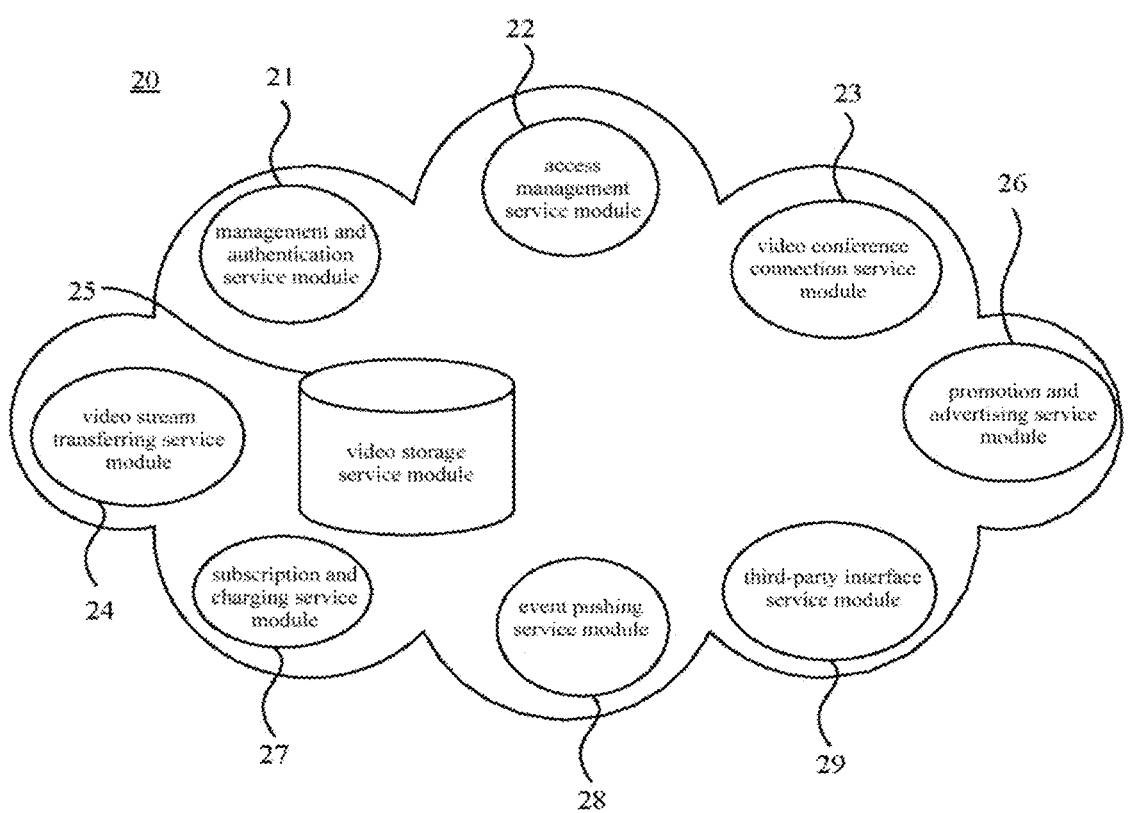
FIG. 9 is a schematic structural diagram illustrating the cloud service system shown in the embodiment of FIG. 8.

The cloud service system 20 is a software service system running in the cloud, which may be configured to provide software services to the video conference device 10. The cloud service system 20 may support connection and management for videos. The cloud service system may provide multiple business modules. And in the embodiments of the present disclosure, the cloud service system may be implemented by one or more servers. As shown in FIG. 9, the services provided by the cloud service system 20 may include device access and management services, video conference connection service, video stream transferring service, video conference storage service, user management and authentication services, third-party integration and interface services, marketing and advertising services, subscription and charging services as well as event pushing service.

The electronic device 30 is provided thereon with a software application that may be used to configure and manage the device. Functions provided by the software application may include, but are not limited to, user registration and login management, device configuration and management, video conference management, screen sharing, subscription and charging, or marketing.

Figure 10:
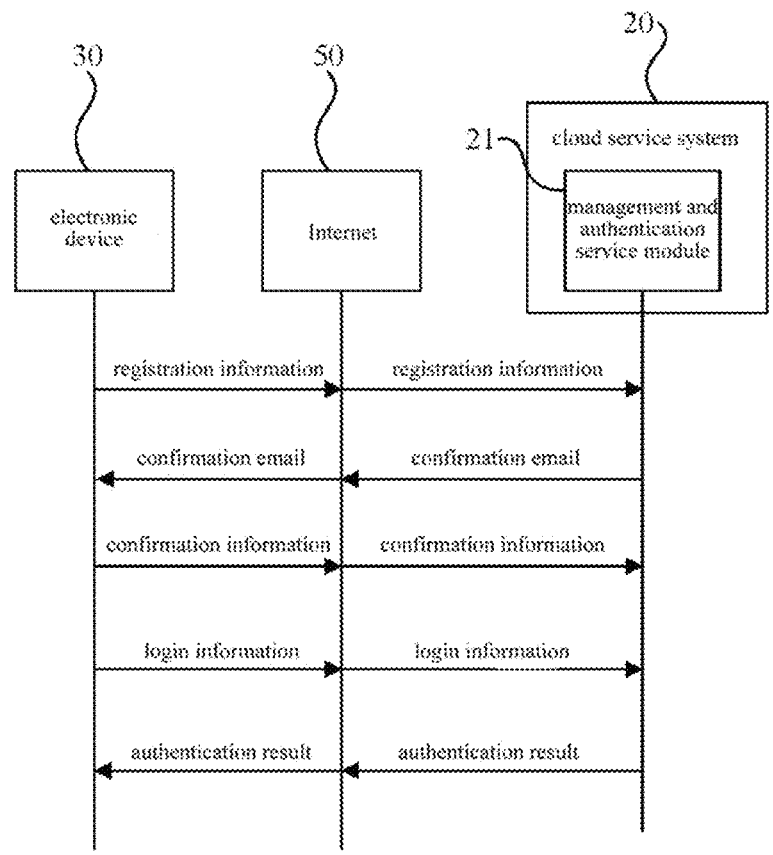
FIG. 10 is a schematic diagram illustrating interactions in the process of registration and login in the embodiment illustrated in FIG. 8.

In a particular embodiment, as shown in FIG. 10, the software application may be configured to provide user registration and user login. When the user uses the software application for the first time, he or she needs to register through the software application, so as to be enabled to configure and manage the video conference device 10 and use the video conference function. After opening the software application, the user needs to log in to the user's account. If there is no account yet, the user needs to register the account, i.e., enters the registration information into the software application. When registering the account, the user may provide for example an email address or mobile phone number for registration. The software application may send the registration information provided by the user to the management and authentication service module 21 of the cloud service system 20, and the management and authentication service module 21 may send a confirmation email to the registered email address provided by the user or may send a confirmation message to the mobile phone number provided by the user, to request confirmation from the user. After the user performs the confirmation, the electronic device 30 may return confirmation information to the management and authentication service module 21. Then, the management and authentication service module 21 creates user information for subsequent authentication of login of the user.

When the user desires to log in to the software application, the login information may be entered, which may include at least the registered email address and a login password that are used in the creation of the account, or the mobile phone number and a login password that are used in the creation of the account. The software application may send the login information to the management and authentication service module 21 via the Internet 50. The management and authentication service module 21 may authenticate the login information, and return the authentication result to the software application via the Internet 50 after the authentication is completed, in which the authentication result may include information on successful authentication or information on failed authentication.

After the registration is successful, the user may log in to the software application so as to: configure the video conference device 10; check the status of the video conference device 10, such as the software and hardware version, the system configuration and the battery level; update the firmware of the video conference device 10; start a video conference; and start the screen sharing; view conference records; replay the stored conference videos or the like.

In a particular embodiment, the cloud service system 20 is configured to store the power supply status upload by the electric management assembly 16 in real-time, and provide the power supply status of the video conference device 10 to the electronic device 30. More particular, after a user successfully registers and logs in an account through the electronic device 30, the user can check the battery status of the rechargeable battery 162 or the connecting status of the direct power supply connector 161 in a software on the electronic service 30, which is linked to the cloud service system 20.

In another particular embodiment, the software application may be used to configure the video conference device 10 after the user logs in. The configuration items may include, but are not limited to, the name of the video conference device 10, the wireless network parameters of the video conference device 10, the user account and key used for communication with the cloud service system 20, audio and video parameters, projection assembly's parameters, the time zone and the current time, event reminders (such as a battery level alert or a reminder indicating the end of the conference), an indication about whether the video is stored locally or in the cloud, or the like. Among others, the wireless network parameters may include parameters with which the video conference device 10 itself accesses the WIFI network and parameters with which the video conference device 10 itself establishes the WIFI network in the dual-frequency mode. After configuration, the configuration items may be presented in a list of the user device, and the user may reconfigure the video conference device 10 through the software application.

In another particular embodiment, the software application may be configured to manage the video conference device 10 after the user logs in, including but not limited to deleting the video conference device 10 from the user's device list, restoring the factory settings of the video conference device 10, updating the firmware of the video conference device 10, turning on or off the camera assembly, turning on or off the projection assembly, playing in real time the video/audio from the video conference device 10, or the like.

In another particular embodiment, the software application may be configured to manage the video conference after the user logs in, including starting the video conference, terminating the video conference, starting or terminating the storage of the video conference, selecting and joining a third-party conference system, viewing conference records, replaying the stored video conference, creating a video conference blacklist, creating a video conference address book, or the like.

In another particular embodiment, the software application may also provide a screen sharing function. The software application may be configured to control screen sharing after the user logs in. In an implementation, after the screen sharing is activated, the screen of the electronic device 30 is shared to the video conference device 10, and the video conference device 10 may project the shared screen, or send the shared screen to another conference device 60 for display. The screen sharing function may make it possible to share the screen of the electronic device 30 to the projection assembly, which is convenient for business display, family sharing or sharing by friends.

It can be understood that, the software application may also provide interaction in other ways, for example, voice recognition control may be adopted which however requires the video conference device to be activated; or physical buttons may be set in the video conference system so that various functions may be achieved by means of these physical buttons; or a projected branch may be adopted to realize a virtual keyboard.

In a particular embodiment, the cloud service system 20 may include the management and authentication service module 21, which may be configured to provide user management and authentication services, and may receive and process registration information or login information from the software application. In an implementation, the management and authentication service module 21 may provide registration and login services to the electronic device 30. In the case where the user registers, the management and authentication service module 21 may receive a registration request sent by the electronic device 30, and then send a confirmation email to the registered email account designated by the user or send confirmation information to the registered mobile phone number designated by the user; after the user logs in to the registered email account or performs the information confirmation by clicking on the mobile phone, the management and authentication service module 21 may mark the user as a trusted user. After the registration is successful, the management and authentication service module 21 may authenticate the user whenever the user logs in, to determine whether the user is the trusted user. The authentication information may include, but is not limited to, a password, and it may also include other authentication information, such as a short message code sent to the registered mobile phone number or the registered email account.

Figure 11:
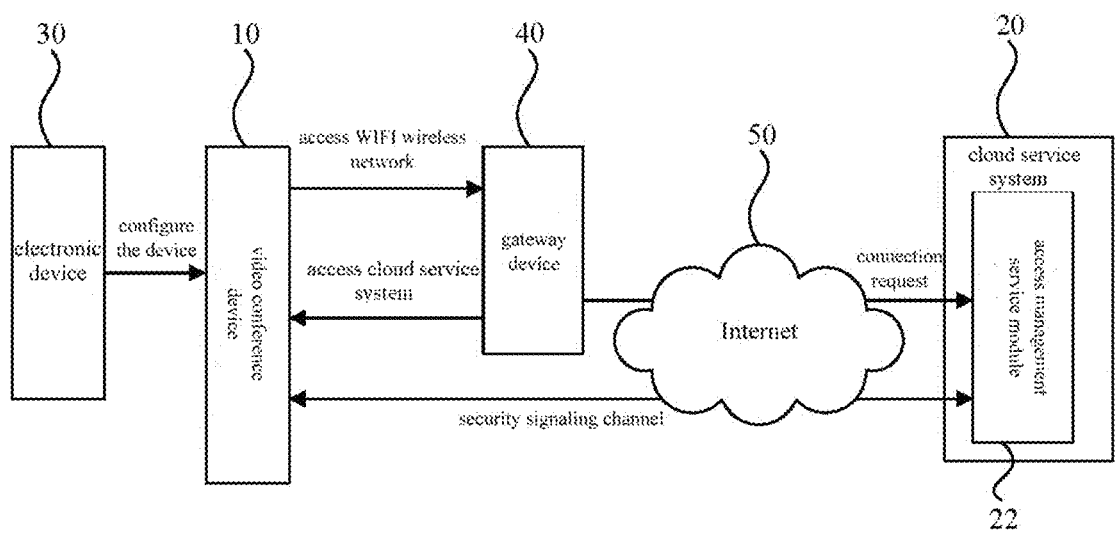
FIG. 11 is a schematic diagram illustrating interactions related to access and management of the device illustrated in the embodiment of FIG. 8.

In another particular embodiment, as shown in FIG. 11, the cloud service system 20 may further include an access management service module 22. The access management service module 22 may be mainly configured for the access and management of the video conference device 10, including but not limited to establishing a secure signaling channel between the cloud service system 20 and the video conference device 10, verifying the authenticity and legality of the video conference device 10, sending to the video conference device 10 commands coming from the software application, assisting the video conference device 10 in upgrading the firmware, or the like.

Further, the access management service module 22 may be configured to authenticate a connection request sent from the video conference device 10, establish a secure signaling channel between the cloud service system 20 and the video conference device 10, as well as monitor and manage the secure signaling channel.

The video conference device 10 may access the WIFI wireless network after being configured by the software application in the electronic device 30, thereby accessing the Internet 50. Then, the video conference device may send a connection request to the access management service module 22 through the Internet 50. The connection request may include, but is not limited to, the user account, the unique identifier of the video conference device 10, the Media Access Control (MAC) address, the electronic certificate of the video conference device 10 and the like. The access management service module 22 may perform user authentication and device authentication on the connection request to ensure the authenticity of the account and the device. On the basis of this, the video conference device 10 and the cloud service system 20 may establish an encrypted data security signaling channel through a communication protocol, which communication protocol may be a standard-based secure communication protocol, such as Transport Layer Security (TLS)/Secure Sockets Layer (SSL), or may also be a user-defined secure communication protocol. The access management service module 22 may monitor and manage the secure signaling channel, for example, it may receive timing verification information from the video conference device 10, receive event information from the video conference device 10, determine the online status of the video conference device 10, send cloud commands to the video conference device 10, transfer instructions coming from the software application to the video conference device 10, and transfer the video conference device 10's response to the instructions.

Figure 12:
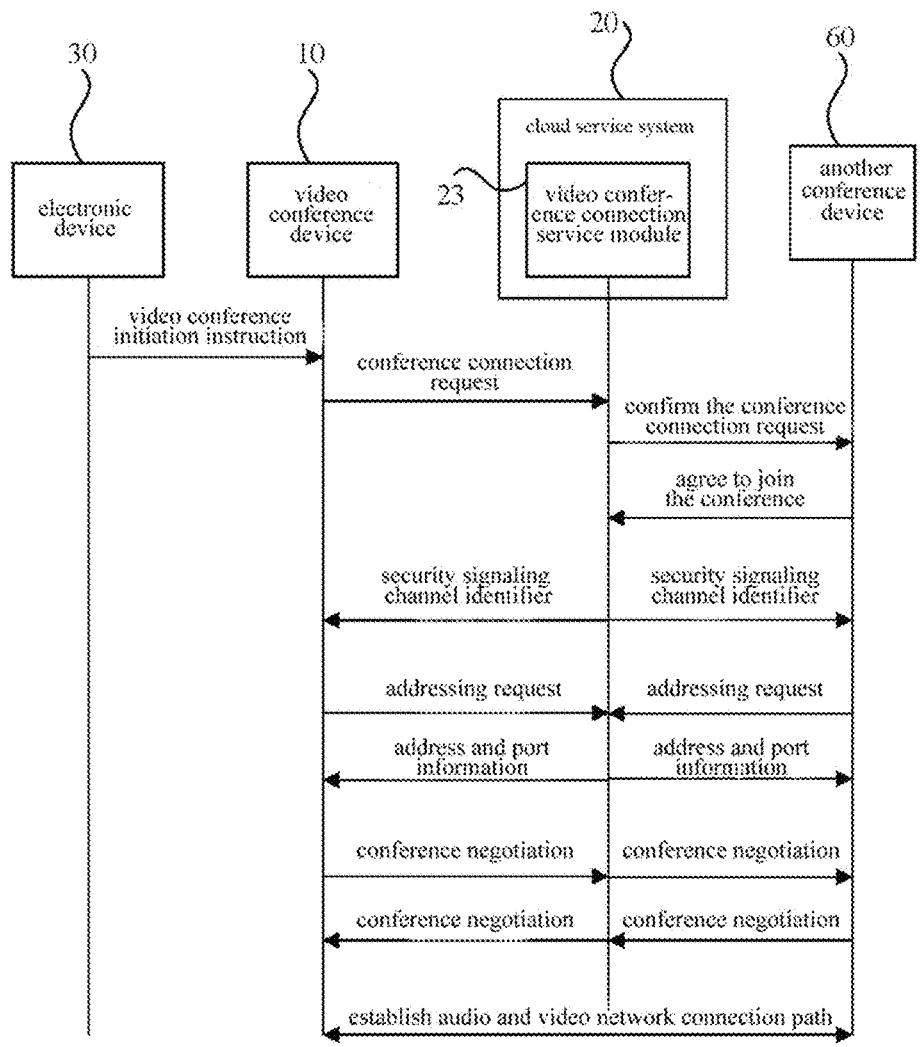
FIG. 12 is a schematic diagram illustrating interactions related to connection of the video conference in the embodiment illustrated in FIG. 8.

In another particular embodiment, as shown in FIG. 12, the cloud service system 20 may further include a video conference connection service module 23 for providing a video conference connection service. The video conference connection service module is mainly configured to assist the video conference device 10 in finding an optimum audio and video network connection path, and assist the video conference device 10 in establishing, with the another conference device 60, a point-to-point real-time two-way data channel for audio and video streams.

The user may control a designated video conference device 10 to initiate a video conference by means of the video conference management function of the software application or the voice control, that is, the electronic device 30 may send a video conference initiation instruction to the video conference device 10, in which the video conference initiation instruction may include at least the name of the registered account of the another conference device 60 and the unique identifier of the video conference device 10. In another embodiment, the video conference initiation instruction may include at least the name of the registered account of the another conference device 60, the unique identifier of the another conference device 60 and the unique identifier of the video conference device 10.

After receiving the video conference initiation instruction, the video conference device 10 may send a conference connection request to the video conference connection service module 23. The conference connection request may include at least the name of the registered account of the another conference device 60 and the unique identifier of the video conference device 10. In another embodiment, the conference connection request may include at least the name of the registered account of the another conference device 60, the unique identifier of the another conference device 60 and the unique identifier of the video conference device 10.

The video conference connection service module 23 may receive the conference connection request sent from the video conference device 10. After confirming that the another conference device 60 accepts the conference invitation, the video conference connection service module may return a secure signaling channel identifier of the another conference device 60 to the video conference device 10. In an implementation, the video conference connection service module 23 may obtain a secure signaling channel of the another conference device 60 based on the conference connection request sent from the video conference device 10, and send the conference connection request to the another conference device 60 through the secure signaling channel. The conference connection request may include at least the name of the registered account of the another conference device 60 and the identifier of the another conference device 60. After determining that the another conference device 60 agrees to join the conference, the video conference connection service module 23 may return a secure signaling channel identifier of the another conference device 60 to the video conference device 10, and may send the security signaling channel identifier of the video conference device 10 to the another conference device 60. In subsequently negotiating parameters of the video conference, the video conference device 10 and the another conference device 60 each need to provide each other's security signaling identifiers, so that the conference connection service module 23 may provide data transfer.

The devices of both parties (including the video conference device 10 and the another conference device 60) may send an addressing request to the video conference connection service module 23. The video conference connection service module 23 may provide addressing services through a standard-based Session Traversal Utilities for Network Address Translation (STUN) protocol or a private protocol. In an implementation, upon receiving the addressing requests sent from the video conference device 10 and the another conference device 60, the video conference connection service module 23 may send externally accessible address and port information of the video conference device 10 to the video conference device 10, and may send the externally accessible address and port information of the another conference device 60 to the another conference device 60. That is, each of the video conference device 10 and the another conference device 60 may obtain, through the video conference connection service module 23, its own information on public IP address and port that can be externally accessed, which may be one or more groups. On such basis, the video conference device 10 and the another conference device 60 may be assisted in negotiating the parameters of the video conference, so that the another conference device 60 and the video conference device 10 each can obtain the other party's externally accessible address and port information based on the parameters of the video conference, to establish an audio and video network connection path. The externally accessible address and port information may include information on IP address and port that can be externally accessed. The parameters of the video conference may include, but are not limited to, their respective camera parameters, projection parameters, externally accessible IP address and port information, and the like. The devices of both parties may establish a point-to-point audio and video network connection path based on the IP address and port information provided by each other, and moreover, perform video communication according to the optimum audio and video parameters that are acceptable by both parties after negotiation, so as to achieve an optimum video conference play effect.

In another particular embodiment, not all conferences may be established with a point-to-point audio and video network connection path. Some devices are restricted by firewall rules and thus cannot provide information on public IP addresses or port that can be accessed externally. In this case, a video stream transferring service module 24 may be adopted to perform transferring. That is, in the case of no suitable path, the video stream transferring service module 24 may provide a video transferring service to ensure that the video conference can be successfully connected.

In an implementation, the video stream transferring service module 24 may be configured to, in a case where no audio and video network connection path meeting a preset condition is found, provide a video stream transferring service address to the video conference device 10 and provide the video stream transferring service address to the another conference device 60. During the process of negotiating the conference connection, the devices of both parties may agree to use the video stream transferring service address as the target address for sending the audio and video streams of the conference. After the video conference device 10 confirms that the video stream transferring service address is used as the target address, the audio and video streams of the conference sent from the video conference device 10 are forwarded to the another conference device 60 for projection and play; the another conference device 60 may send the audio and video streams of the conference to the video stream transferring service module 24, and the video stream transferring service module 24 may transmit such audio and video streams of the conference to the video conference device 10 for projection and playback; in this way, a real-time video conference may be realized. The video stream transferring service may utilize a standard-based Traversal Using Relay for Network Address Translation (TURN) protocol, or may also be a private protocol.

In another particular embodiment, the cloud service system 20 may further include a video storage service module 25. The video storage service module 25 may be configured to provide a video storage service. The video storage service is used to store conference videos and enable the software application to replay the recorded conference videos. In an implementation, the video conference device 10 may upload the audio stream and video stream of the current conference to the video conference storage service module upon receiving a video conference storage command, and the video conference storage service module may encode and merge the audio stream and the video stream, and convert them into a playable video file for storage.

During the video conference, the user may instruct the video conference device 10 to store the video conference, by means of the software application or the voice control. The video conference device 10 may upload simultaneously a copy of the audio stream and a copy of video stream of the current conference to the video storage service module 25, upon receiving the video conference storage command. The video storage service module 25 may encode and merge the audio stream and the video stream, and convert them into a playable video file for storage. The video file may support the MP4 format (MPEG Layer 4). Further, the video storage service module 25 may store the video conference continuously, or may divide the video conference into segments for storage.

During the conference, the user may instruct the video conference device 10 to cancel the storage of the video conference, by means of the software application or the voice control. The video conference device 10 may stop uploading the audio stream and video stream of the conference to the video storage service module 25, upon receiving a conference storage cancellation command. After the video conference ends, the conference storage function is automatically terminated.

The video storage service module 25 may also offer video access. The software application may access the video storage service module 25 to obtain the stored video files, thereby replaying the video conference.

In another particular embodiment, the cloud service system 20 may further include a promotion and advertising service module 26. The promotion and advertising service module 26 may be configured to provide marketing and advertising services, and the marketing and advertising services may provide platforms for up-sell, cross-sell, marketing and advertising. The video conference device 10 may obtain marketing information or advertisements from the promotion and advertisement service module 26, during the startup waiting period or the video projection process.

In an implementation, the software application in the mobile phone or computer may be configured to provide marketing services after the user logs in, so that the user can be reminded of new product launches, new discount information, new company activities or the like on an appropriate page and appropriate location of the software application. It should be noted that the marketing service of the software application may be implemented in many ways. For example, when the user opens the software application, a pop-up window may be adopted to remind that there are new product launches, new discount information, new company activities, or the like, and the account can be normally logged in only after the user manually closes the pop-up window or after the pop-up window is automatically closed since no response is made in one minute. Alternatively, the marketing service may also utilize the scroll bar on the software application page, that is, a way of scrolling a message on the software application page may be adopted to remind the user that there are new product launches, new discount information, new company activities, or the like. Without affecting the user's mood and experience, the video conference device 10 may also obtain marketing information or advertisements from the promotion and advertising service module 26, and then project them in a moderate amount at an appropriate area by using the projection assembly, for example new product launches, discount information, or even commercial advertising information may be projected in an appropriate size at an appropriate area and at a right time.

In another particular embodiment, the cloud service system 20 may further include a subscription and charging service module 27. The subscription and charging service module 27 may be configured to provide subscription and charging services. The subscription and charging service module 27 may be configured to: receive subscription information and charging information sent from the electronic device 30; manage the user's subscription; and interact with a third-party payment platform on schedule, to perform the charging, generate corresponding electronic receipts and tax records, and send them to the registered mobile phone number or the registered email account. The subscription and charging service may also be responsible for processing the user's un-subscription and refund, forming a record file and sending it to the registered account registered at the electronic device 30.

Further, the electronic device 30 may provide the user with subscriptions for certain paid services. The user may subscribe monthly or annually. For example, as for the conference video storage service, different subscription fees may be charged according to the size of cloud storage space; and the fees may be paid through credit card payment, debit card payment, Alipay payment, WeChat payment or PayPal payment. The subscription and charging services may provide subscription and charging lists, and send them to the user's registered email account; moreover, the software application may display the status of the subscription.

In another particular embodiment, the software application may configure the subscription and charging services after the user logs in. The user may subscribe, on a monthly/annual basis, to some paid services, such as video conference cloud storage service, multi-party video conference service or video content projection service. The software application may provide a charging function, and may support payment through multiple platforms, such as Visa card, Master card, American Express, Alipay, WeChat Pay or UnionPay.

Further, the subscription and charging services of the software application may be only responsible for collecting information input by the user, and not responsible for processing and executing the user's subscription and payment. The software application may pass the collected information input by the user to the subscription and charging service module 27 of the cloud service system 20 for specific processing and execution, so that the subscription and charging service module 27 may open the subscription function for the user, and then the user can select the desired subscription function in the software application as required. It should be noted that, there are many types of subscription services and some subscription functions are free, after each user registers successfully, a part of free subscription functions are activated for this user by default; in this case, the user may choose, in the software application, whether to accept the free subscription functions such as the battery level alert, but other high-end subscription functions are not available at this time. If the user needs to use some high-end subscription functions, he/she should pay for them on a charging page, and after the successful payment, the cloud service system 20 will enable the high-end subscription functions for the user who has paid therefor. At this time, the user may choose whether to accept the free subscription functions in the software application. It should be noted that, whether it is a free subscription function or a paid subscription function, the user needs to choose whether to accept subscription reminders therefor in the software application, and the cloud service system 20 does not enable the function of accepting subscription reminders for the user by default.

In another particular embodiment, the cloud service system 20 may further include an event pushing service module 28 for providing an event pushing service. The event pushing service module 28 may be configured to: receive an event sent from the video conference device 10 or other service modules in the cloud service system 20, such as online, offline, low battery level, a conference request from the another party or successful charging; convert the event into event information and push the event information to the software application in the electronic device 30, so that the event information is enabled to be displayed by the software application in the electronic device 30 in the center of a message prompt.

The event pushing service may push information to the software application when a specified event occurs, reminding the user of the occurrence of the specified event. For example, the video conference device 10 may generate an event upon detection of a low battery level, and send the generated event to the event pushing service module 28; the event pushing service module 28 may push information to the software application to remind the user of the low battery level. Alternatively, the subscription and charging service module may generate an event after the subscription fee is successfully charged at the Alipay platform on a designated charging day, and may send the event to the event pushing service module 28; the event pushing service module 28 may push information to the software application to remind the user that the transaction of charging fees for a certain service subscribed by the user in this month or this year is successful. Alternatively, the another party of the conference may request a video conference, and the software application may receive corresponding notification information, so as to make the user respond in time.

In another particular embodiment, the cloud service system 20 may further include a third-party interface service module 29. The third-party interface service module 29 may be configured to provide a function of interfacing with other products or applications. The video conference device 10 may communicate, through the third-party interface service module 29, with the cloud of another party joining the conference, so as to communicate with the another conference device 60 through the cloud of the another party joining the conference. Alternatively, the video conference device 10 may be associated with other cloud services through the third-party interface service module 29, so as to obtain the other cloud services, such as video content service.

Further, the user may instruct the video conference device 10 to join a third-party conference system, by means of the voice control or video conference management of the software application, in which the third-party conference system may include, but is not limited to, Zoom, WebEx, or Tencent Meeting. The video conference device 10 may join, through the third-party interface service module 29, a conference invited by the third-party conference system, and the video conference device 10 may report information of the third-party conference system to the third-party interface service module 29. The information of the third-party conference system may include, but is not limited to, network address of a provider of the conference, a dialup number for the conference or a password for the conference. The third-party interface service module 29 may receive the information of the third-party conference system sent from the video conference device 10, establish a video connection with the third-party conference system, and then transfer the audio and video streams of the conference generated by the third-party conference system to the video conference device 10 for projection and play, and transfer the audio and video streams of the conference generated by the video conference device 10 to the third-party conference system. In an implementation, the video stream of the conference scene captured by the camera assembly and the audio stream obtained by the array of microphones may be transferred to the other party joining the conference, so that the two parties in the conference may establish a video conference basing on cloud-to-cloud connection.

In other embodiments, the cloud service system 20 may not be needed for establishing video connection and video transferring. In this case, the IP address and port of another party joining the meeting may be directly designated, so as to establish a conference connection and video communication. This is suitable for a case where the IP address and port of each device are assigned in advance.

Figure 13:
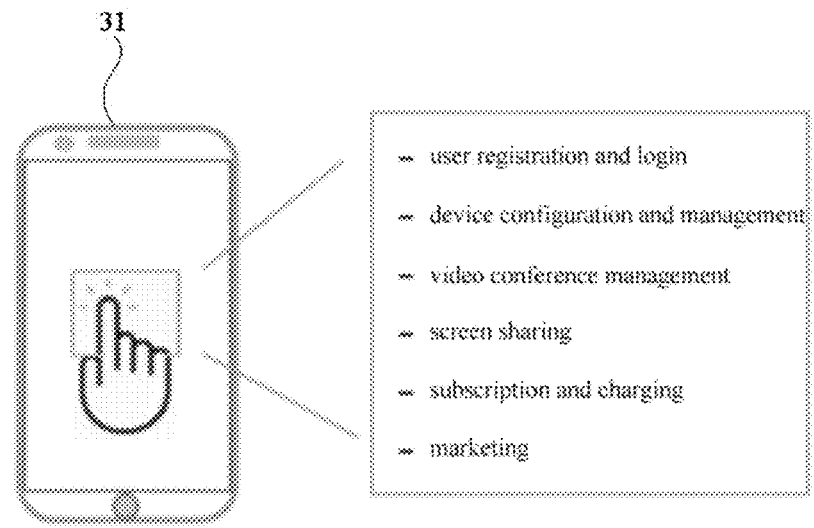
FIG. 13 is a schematic diagram illustrating a mobile phone terminal according to an embodiment of the present disclosure.

In a particular application scenario, the electronic device 30 may be a mobile phone terminal 31. As shown in FIG. 13, on the mobile phone terminal 31, a software application runs, which may provide functions of for example user registration and login, device configuration and management, video conference management, screen sharing, subscription and charging, and marketing. The video conference device 10 is referred to as a device for short below.

The software application may perform network communication with the device through the mobile phone terminal 31. For example, the mobile phone terminal 31 and the device may access a same WIFI network and communicate with each other via the gateway device 40, as shown in FIG. 4; alternatively, the mobile phone terminal 31 may directly access the device's own wireless network to communicate, as shown in FIG. 3 and FIG. 5; alternatively, the mobile phone terminal may communicate with the device through a wireless Bluetooth connection, and make the high-speed data processed through WIFI, such as playing the video stream generated by the device, as shown in FIG. 6; alternatively, the software application may remotely communicate with the device through the cloud service system 20, as shown in FIG. 7. Further, in remote communication, the software application on the mobile phone terminal 31 and the device do not need to be on a same network; in this case, the mobile phone terminal 31 may send a control command to the access management service module 22 of the cloud service system 20, and the command may be transmitted to the device through a secure signaling channel established between the device and the cloud service system 20, thereby achieving communication with the device.

1) User Registration and Login Function

Figure 14:
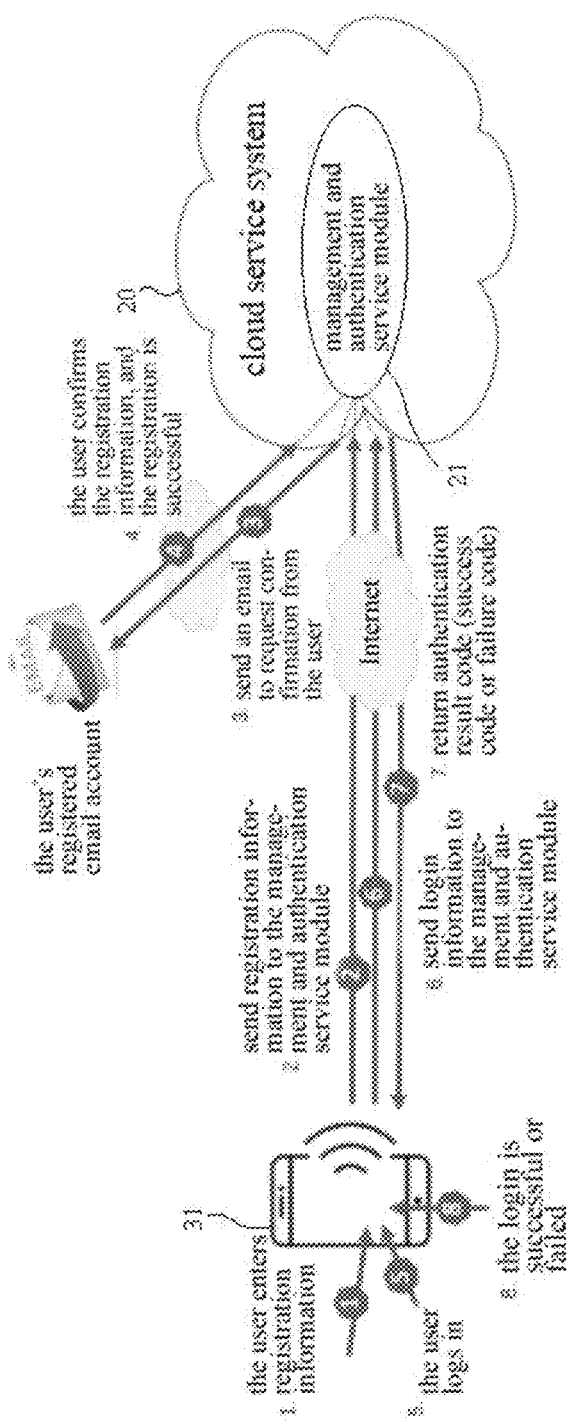
FIG. 14 is a schematic diagram illustrating interactions among the mobile phone terminal, the video conference device and a cloud service system according to an embodiment of the present disclosure.

This software application may be configured to provide the user with registration and login. When the user opens the software application on the mobile phone terminal 31, the user may need to log in to the account. If the user does not have an account yet, the user needs to register one. At the time of registration, the user may need to provide at least an email address. The software application on the mobile phone terminal 31 may send the registration information provided by the user to the management and authentication service module 21 of the cloud service system 20, and the management and authentication service module 21 may send an email to the email address provided by the user, to request confirmation from the user. After the user performs the confirmation, confirmation information may be returned to the management and authentication service module 21 of the cloud service system 20, so that the management and authentication service module 21 may create user information for subsequent authentication for login of the user. When the user logs in, the login information may need to be entered. The login information may include at least the email address and a login password that are used in the creation of the account. The software application on the mobile phone terminal 31 may send the login information entered by the user to the management and authentication service module 21 of the cloud service system 20 via the network. The management and authentication service module 21 may verify the login information entered by the user, and return a login success code or a login failure code after the verification is completed, as shown in FIG. 14.

2) Device Configuration and Management Function

The software application may also be used to configure the device after the user logs in. The configuration items may include, but are not limited to, the name of the device, the wireless network parameters of the device (including parameters with which the device itself accesses the WIFI network and parameters with which the device itself establishes the WIFI network in the dual-frequency mode), the user account and device key used for communication with the cloud service system 20, audio and video parameters, projection assembly's parameters, the time zone where the service system 20 is located and the current time, event reminders (such as a battery level alert or a reminder indicating the end of the conference), an indication about whether the video is stored locally or in the cloud or the like. After the device is configured, the configuration items may be presented in a list of the user device, and the user may reconfigure the device through the software application on the mobile phone terminal 31.

The software application may be configured to manage the device after the user logs in, including but not limited to deleting the device from the user's device list, restoring the factory settings of the device, updating the firmware of the device, turning on or off the camera assembly, turning on or off the projection assembly, playing in real time the video/audio from the device, and the like.

3) Video Conference Management Function

The software application may be configured to manage the video conference after the user logs in, including starting the video conference on a specified device, terminating the video conference, starting or terminating the storage of the video conference, replaying the stored video conference, creating a video conference blacklist, creating a video conference address book or the like.

4) Screen Sharing Function

The software application may be configured to control screen sharing after the user logs in. After the screen sharing is activated, the screen of the mobile phone terminal 31 may be shared to the device, and the device may project the shared screen, or send the shared screen to the another conference device 60 for projection and display.

5) Subscription and Charging Functions

The software application may be used to configure subscription and charging services after the user logs in. The user may subscribe, on a monthly/annual basis, to some paid services, such as video conference cloud storage service, multi-party video conference service or video content projection service.

The software application may provide a charging function, and may support payment through multiple platforms, such as Visa card, Master card, American Express, Alipay, WeChat Pay or UnionPay. The subscription and charging services of the software application are only responsible for collecting information input by the user, and are not responsible for processing and executing the user's subscription and payment. The subscription and charging services may pass the collected information input by the user to the subscription and charging service module 27 of the cloud service system 20 for specific processing and execution.

The subscription and charging service module 27 may be configured to, after receiving the subscription information and charging information sent from the mobile phone terminal 31, manage the user's subscription; and interact with a third-party payment platform on schedule, to perform the charging, generate corresponding electronic receipts and tax records, and send them to the registered mobile phone number or the registered email account.

6) Marketing Function

The software application may be configured to provide marketing services after the user logs in, so that the user can be reminded of new product launches, new discount information, new company activities or the like on an appropriate page and appropriate location of the software application.

Further, the software application may also be configured to receive marketing information or advertisements sent from the promotion and advertisement service module 26 in the cloud service system 20, for displaying it or sending it to the registered email address of the user.

In practice, when the user uses the software application for the first time, he or she needs to register an account through the software application. The software application may obtain the registration information entered by the user, and then send the registration information to the management and authentication service module 21. The management and authentication service module 21 may return a confirmation message to request confirmation from the user. After the user confirms that the information is correct, the account registration may be completed. After the successful registration, the user may configure the device or use the default configuration, for example, the user may modify the name of the device. After the configuration is completed, the user may control the device to turn on and communicate with another conference device 60. During the video conference, the user may utilize the software application to control the device's sound level, select whether to perform the screen sharing, select whether to turn off the camera, suspend the conference, or the like. In addition, the user may adjust the device through voice, to achieve voice control. After the video conference ends, the user may also utilize the software application to determine whether to save the stored video for review, and if it needs to be saved, an instruction may be sent to the device so that the device may save the conference video in the SD card. The mobile phone terminal 31 may interact with the device and the cloud service system 20 through the software application, making the control over the device more convenient and user-friendly.

Figure 15:
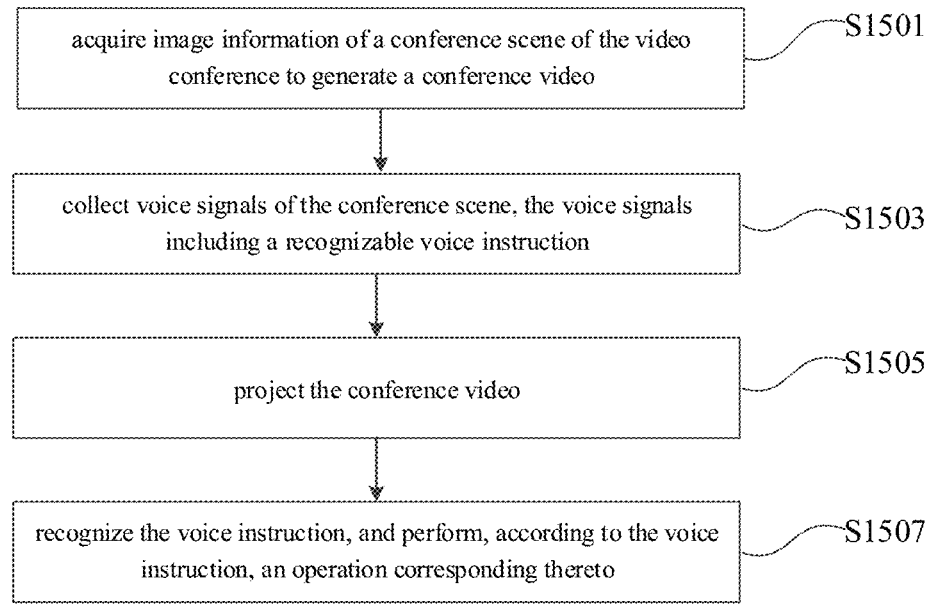
FIG. 15 is a schematic flowchart of a method of performing a video conference by video conference device according to an embodiment of the present disclosure.

Referring to FIG. 15, a schematic flowchart of a method of performing a video conference by the video conference device according to an embodiment of the present disclosure is shown, and the method implemented by the video conference device may include steps S1501 to S1507 as follows.

In step S1501, image information of a conference scene of the video conference is acquired, to generate a conference video. In step S1503, voice signals of the conference scene are collected, the voice signals including a recognizable voice instruction. In step S1505, the conference video is projected. In step S1507, the voice instruction is recognized, and an operation corresponding to the voice instruction is performed according to the voice instruction.

In an implementation, step S1507 may include: recognizing the voice instruction to obtain keyword information; detecting whether the keyword information is included in a preset thesaurus; and perform an operation corresponding to the keyword information, when it is determined that the keyword information is included in the preset thesaurus. In an implementation, the keyword information may include command keywords/phrases or confirmation keywords/phrases. The command keywords/phrases may include "turn on/off the projection assembly", "turn on/off the camera assembly", "shut down", "turn up the volume" or "turn down the volume". The confirmation keywords/phrases may include "yes" or "no".

In another implementation, step S1507 may include: recognizing the voice instruction to obtain keyword information, the keyword information comprising wake-up keywords/phrases that are customized; intercepting, after obtaining the wake-up keywords/phrases, a subsequent voice signal output by the audio input assembly; generating a voice instruction to be analyzed, based on the intercepted voice signal; sending the voice instruction to be analyzed to the cloud service system; and receiving an executable voice instruction dent returned from the cloud service system that is obtained by performing, at the cloud service system, semantic analysis on the voice instruction to be analyzed.

Particularly, step S1501 may be implemented by the camera assembly 11 of the video conference device 10; step S1503 may be implemented by the audio input assembly 12 of the video conference device 10; step S1505 may be implemented by the projection assembly 13 of the video conference device; and step S1507 may be implemented by the projection processor of the main processor of the video conference device.

In an embodiment, the method may further include steps of: performing noise reduction processing on the collected voice signal to generate a pulse density modulated digital signal; digitally filtering, extracting and adjusting the pulse density modulated digital signal, to generate a pulse code modulated data stream; performing echo cancellation processing on the pulse code modulated data stream to generate a first signal; filtering the first signal to generate a first filtered signal; detecting, based on the first signal and the first filtered signal, a direction of voice source and form a pickup beam area; performing noise suppression processing on the pickup beam area, to generate a second signal; performing reverberation elimination processing on the second signal, to generate a third signal; recognizing keywords/phrases from the third signal to generate a recognition result; and executing an action corresponding to the recognition result. Among others, the step of performing noise reduction processing may be particularly performed by the audio input assembly 12, and the other steps mentioned above may be implemented by the projection processor or the main processor of the video conference device 10.

In an embodiment, the method may further include a step of playing an audio signal sent by the projection processor or the main processor. Particularly, this step may be implemented by the audio output assembly 14 of the video conference device 10.

In an embodiment, the method may further include a step of receiving a control command that is sent by the electronic device 30 and transferred by the cloud service system 20 to the video conference device 10. Particularly, this step may be implemented by the wireless communication assembly 15 of the video conference device 10.

In an embodiment, in a case where it is detected that a battery level of the rechargeable battery 16 of the video conference device 10 is lower than a preset percentage, the method may further include a step of: controlling a current battery level to be displayed on a video screen being displayed by the projection assembly 13, for battery level alert; or push a notification message to the electronic device 30 through the cloud service system 20, the notification message including the current battery level; or issuing an alert for the battery level, by means of at least one LED of the video conference device 10. Particularly, this step may be implemented by the projection processor or the main processor of the video conference device 10.

In an embodiment, the method may further include steps of: establishing an audio and video network connection path with another video conference device; sending the generated conference video and the collected voice signals simultaneously to the another video conference device, through the audio and video network connection path; and playing an audio stream received from the another conference device, and meanwhile projecting a video stream received from the another conference device. Particularly, the step of establishing an audio and video network connection path and the step of sending the generated conference video and the collected voice signals may be implemented by the wireless communication assembly 15 of the video conference device 10, and the step of playing the audio may be implemented by the audio output assembly 14 of the video conference device 10, and the step of projecting the video stream may be implemented by the projection assembly 13 of the video conference device 10.

In an implementation, the step of establishing an audio and video network connection path with another video conference device may include: sending a conference connection request to the cloud service system 20; receiving a secure signaling channel identifier of another video conference device that is returned by the cloud service system 20, after the cloud service system 20 confirms that the another video conference device accepts a conference invitation; sending an addressing request to the cloud service system 20, to receive, from the cloud service system 20, externally accessible address and port information of the video conference device; negotiating, with the another video conference device, parameters of a video conference to be established; and establishing an audio and video network connection path with the another video conference device, where the conference connection request includes at least a name of a registered account of the another video conference device and an identifier of the another conference device, the externally accessible address and port information includes information on network address and port that can be accessed externally, and the parameters of the video conference include camera parameters, projection parameters, and the address and port information.

In an embodiment, the method may further include a step of: uploading audio and video streams of a current conference to the cloud service system, upon receiving a video conference storage command. Particularly, this step may be implemented by the wireless communication assembly 15 of the video conference device 10.

It should be noted that, detailed operations related to all steps of this method mentioned above have already described in the forgoing, which will not be repeated here.

As mentioned above, the projection-type video conference system provided by embodiments of the present disclosure may include a video conference device and a cloud service system. The video conference device incorporates a camera assembly, a projection assembly and an audio input assembly with a high level of integration. The camera assembly can capture the conference scene and provide a high-definition panoramic effect. The projection assembly can project the high-definition video captured by the camera assembly or the video sent from another party joining the conference. Since the projection assembly is utilized to display the conference scene, the video can be directly projected onto the wall without the need for a display screen. This makes it small in size and convenient for the user to carry. In addition, voice control is introduced into the video conference device, which provides voice recognition and voice control functions; in this way, the video conference device may be controlled through voice recognition and control, for example, the conference connection, the volume adjustment, the turning on/off of the camera or projection assembly and the like may be controlled by means of voice control. Hence, intelligent control may be provided without controlling the device manually by the user, simplifying the user's operation.

Rather, a portable high-definition projection-type video conference system is provided. The system includes a video conference device based on a high-definition and high-brightness projection assembly, a cloud service system that may support video connection and management, and a software application for configuring and managing the video conference device. The video conference device may be a portable high-definition and high-brightness projection assembly that integrates multiple functions. The top of the video conference device may incorporate a high-definition panoramic camera assembly with privacy protection. The camera assembly may be raised and lowered, and particularly it may descend to hide inside the housing if no video is needed. The video conference device may also incorporate a 360-degree array of microphones and a 360-degree audio input assembly, a WIFI wireless communication assembly, a rechargeable battery, a SD card storage and other physical modules. The cloud service system may provide the access and management services, video conference connection service, video stream transferring service, video conference storage service, user management and authentication services, subscription and charging services, and event pushing service. The software application may be software running on electronic terminal devices, such as mobile phones, tablets or other computers. By means of the software application, the user may configure the video conference device and manage video conferences, and may share the screens of electronic device to the video conference device for projection. The video conference device may be connected to the cloud service system, after being configured through the software application. By means of the software application, the user may control the video conference device to initiate the video conference, and establish, with another conference device, a point-to-point or point-to-multipoint real-time two-way data channel for audio and video streams with the assistance of various functional modules in the cloud service system. The camera on the top of the video conference device and the built-in array of microphones capture the video and audio of the local scene, and send them in real time to the another conference device through the data channel for audio and video streams, for video projection and audio playback. Meanwhile, the another conference device may send the collected video and audio synchronously to the local video conference device through the data channel for audio and video streams, for projection and playback, thereby forming a video conference.

In summary, the system provided by embodiments of the present disclosure is a wireless video conferencing system integrating multiple functions, which is convenient, practical and simple to use, may solve many drawbacks of the existing video conference systems, and have at least the following advantages:

1) The video conference device is portable and battery-powered. It can be used at any time as required. The video conference device incorporates a high-definition panoramic camera assembly and a high-definition and high-brightness projection assembly, and has the function of privacy protection. By replacing the traditional TV screen or monitor with the high-definition and high-brightness projection assembly, the projection size can be adjusted, enabling it to serve as a home theater. It can support wireless pairing with a variety of devices having a display screen, such as laptops, mobile phones or tablets, enabling screen sharing and content display by projection. It is not only suitable for local business presentations, but also suitable for use in families and between friends, and suitable for screen sharing of remote conferences. In addition, it supports local SD card storage, and can use the SD card to store the conference videos for replay.

2) The existing video conference systems need arrangement in advance, for example, another party needs to be informed to dial in a specified conference number at a specified time. This loses the advantage of dial-and-talk of the traditional phones. In addition, many conferences cannot be predicted in advance, and it is unable to determine whether the another party can receive the conference information for a temporarily arranged conference. The system provided by embodiments of the present disclosure makes it possible to directly dial the another party at any time if a conference is required. Each video conference device has a unique identifier. The cloud service system may be utilized to achieve optimal data connection without the need for traditional telephone systems and lines. The dialing can be realized through voice or through the software application, which is convenient and fast; and the another party can choose to accept or hang up after receiving the reminder of the conference invitation, which has the advantage of traditional telephones that the dial can be made as required and quick connection is enabled.

3) Cloud service function is offered. The cloud service system may be utilized to realize the optimized point-to-point or point-to-multipoint video conference connection, and to provide subscription and charging services, such as video content service, advertising service or conference storage service. Interaction with third-party conference systems can also be achieved by means of the cloud service system. In addition, the cloud service system can also provide the device access and management services, video stream transferring service, user management and authentication services, event pushing service, and the like, enabling interaction among the electronic device, the video conference device, and the cloud service system.

4) The software application is provided, which may support voice recognition and voice control. In this way, it is convenient for the user to configure and manage the video conference device, control the conferences and screen sharing, or adjust audio and video parameters, through mobile phones or other devices having a display screen.

Items:

Item 1: A projection-type video conference device, including: a projection assembly configured to display a conference video; a rechargeable battery configured to supply power for the projection assembly; a detection assembly configured to detect a battery level of the rechargeable battery; wherein the projection assembly produce a battery level alerting signal when the detection assembly detected that the battery level of the rechargeable battery reaching a preset threshold.

Item 2: The projection-type video conference device according to item 1, wherein the battery level alerting signal includes at least one of a visual alerting signal and a voice alerting signal.

Item 3: The projection-type video conference device according to item 2, wherein the visual alerting signal is a brightness reducing of a current conference video controlled by the projection assembly, or a battery level alerting image displayed in the current conference video displayed by the projection assembly.

Item 4: The projection-type video conference device according to item 2, wherein the voice alerting signal is an alerting voice broadcasted by the projection assembly.

Item 5: The projection-type video conference device according to item 1, wherein the projection-type video conference device further includes a control assembly configured to control the projection assembly, the control assembly is electrically connected to the detection assembly, the control assembly is configured to: in a case that the detection assembly detects the battery level of the rechargeable battery reaches the preset threshold, control the projection assembly to reduce a brightness of a current conference video, or control the projection assembly to display a battery level alerting image in the current conference video.

Item 6: The projection-type video conference device according to item 5, wherein the projection-type video conference device further includes a speaker assembly which is electrically connecting to the control assembly and configured to: in a case that the detection assembly detects the battery level of the rechargeable battery reaches the preset threshold, control the speaker assembly to broadcast an alerting voice.

Item 7: The projection-type video conference device according to item 1, wherein the projection assembly adopts a semiconductor light source.

Item 8: The projection-type video conference device according to item 1, wherein the rechargeable battery is removable.

Figure 16:
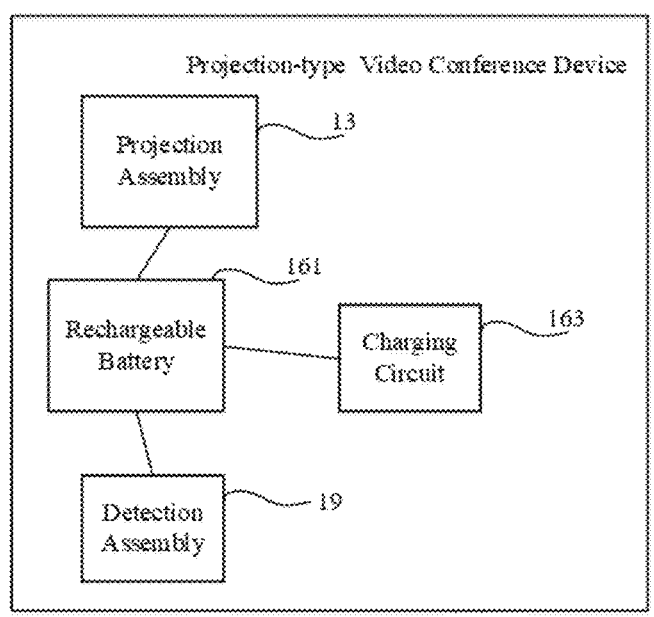
FIG. 16 is a schematic structural diagram according to an embodiment of a projection-type video conference device of the present application.

Refer to FIG. 16, the projection-type video conference device 70 includes a projection assembly 13, a rechargeable battery 161, a detection assembly 19, and a charging circuit 163. Specifically, the detection assembly 19 is configured to detect a battery level of the rechargeable battery 161; and the charging circuit 163 is configured for charging the rechargeable battery.

The foregoing are only examples of this disclosure, and do not limit the scope of the disclosure. Any equivalent structure or equivalent process variants made on the basis of the contents of the specification and drawings of this disclosure, or direct or indirect application to other related technical fields, should all be included in the scope protection of this disclosure.

What is claimed is:

1. A projection-type video conference system, comprising a video conference device and a cloud service system, the cloud service system is configured to provide services to the video conference device, wherein the video conference device comprises:
   an electric management assembly configured to supply power to the video conference device, detect a power supply status of the video conference device and upload the power supply status to the cloud service system in real-time;
   a projection assembly configured to display the power supply status sent from the electric management assembly;
   an audio input assembly configured to collect voice signals of a conference scene and an audio output assembly configured to broadcast the power supply status sent from the electric management assembly, wherein the voice signals comprising a recognizable voice instruction;
   wherein the electric management assembly further comprises at least one direct power supply connector configuring for directly powering the video conference device through an external power supply; and wherein the electric management assembly is configured to detect a connecting status of the direct power supply connector of the video conference device and upload the connecting status of the direct power supply connector to the cloud service system in real-time.

2. The projection-type video conference system according to claim 1, wherein the cloud service system is configured to provide a power supply status storage service for the electric management assembly.

3. The projection-type video conference system according to claim 1, wherein the electric management assembly comprises at least one rechargeable battery which is configured for powering the video conference device, and wherein the rechargeable battery is removable.

4. The projection-type video conference system according to claim 3, wherein the electric management assembly is configured to detect and record a battery status of the rechargeable battery in real-time, and the electric management assembly is further configured to upload the battery status to the cloud service system.

5. The projection-type video conference system according to claim 4, wherein the electric management assembly is configured to: in a case where it is detected that a battery level of the rechargeable battery is lower than a preset percentage, control to display a current battery level and a cruising duration of battery on a screen of the projection assembly.

6. The projection-type video conference system according to claim 4, wherein the electric management assembly is configured to: in a case where it is detected that a battery level of the rechargeable battery is equal to or lower than a preset percentage, send a warning for reminding of that the projection assembly is about to be turned off, which is broadcasted via a voice message by the audio output assembly, and turn off the projection assembly in a preset time.

7. The projection-type video conference system according to claim 1, wherein the electric management assembly is configured to: in a case where it is detected that the direct power supply connector of the video conference device connects or disconnects to an external power supply, control to display the corresponding connecting status on the screen of the projection assembly.

8. The projection-type video conference system according to claim 1, wherein the electric management assembly is configured to: in a case where the direct power supply connector of the video conference device disconnects to an external power supply while a battery level of a rechargeable battery of the video conference device is lower than a preset percentage, control to display the corresponding connecting status on the screen of the projection assembly, and control the audio output assembly to broadcast a power-off warning via a voice message at the same time.

9. The projection-type video conference system according to claim 1, wherein the projection assembly further comprises a projection processor which is configured to recognize a voice instruction from the collected voice signals of the conference scene, in a case that the voice instruction is about the power supply status of the video conference device, the electric management assembly control the audio output assembly to broadcast the corresponding power supply status.

10. The projection-type video conference system according to claim 1, the cloud service system comprises a management and authentication service module for providing registration and login services to an electronic device, the cloud service system is configured to provide the power supply status of the video conference device to an electronic device linked to the cloud service system after the electronic device successfully registers and logs in an account.

11. The projection-type video conference system according to claim 1, wherein a light source of the projection assembly is at least one of a semi-conductor light source and a florescent light source.

12. A projection-type video conference system, comprising a video conference device and a cloud service system, the cloud service system is configured to provide services to the video conference device, wherein the video conference device comprises:
    an electric management assembly configured to supply power to the video conference device, detect a power supply status of the video conference device and upload the power supply status to the cloud service system in real-time;
    a projection assembly configured to display the power supply status sent from the electric management assembly;
    an audio input assembly configured to collect voice signals of a conference scene and an audio output assembly configured to broadcast the power supply status sent from the electric management assembly, wherein the voice signals comprising a recognizable voice instruction;
    wherein the electric management assembly comprises at least one rechargeable battery which is configured for powering the video conference device, and wherein the rechargeable battery is removable;
    wherein the electric management assembly is configured to detect and record a battery status of the rechargeable battery in real-time, and the electric management assembly is further configured to upload the battery status to the cloud service system; and
    wherein the electric management assembly is configured to: in a case where it is detected that a battery level of the rechargeable battery is equal to or lower than a preset percentage, send a warning for reminding of that the projection assembly is about to be turned off, which is broadcasted via a voice message by the audio output assembly, and turn off the projection assembly in a preset time.

13. A projection-type video conference system, comprising a video conference device and a cloud service system, the cloud service system is configured to provide services to the video conference device, wherein the video conference device comprises:
    an electric management assembly configured to supply power to the video conference device, detect a power supply status of the video conference device and upload the power supply status to the cloud service system in real-time;
    a projection assembly configured to display the power supply status sent from the electric management assembly;
    an audio input assembly configured to collect voice signals of a conference scene and an audio output assembly configured to broadcast the power supply status sent from the electric management assembly, wherein the voice signals comprising a recognizable voice instruction;
    wherein the projection assembly further comprises a projection processor which is configured to recognize a voice instruction from the collected voice signals of the conference scene, in a case that the voice instruction is about the power supply status of the video conference device, the electric management assembly control the audio output assembly to broadcast the corresponding power supply status.

\* \* \* \* \*